US011622153B2

(12) United States Patent
He et al.

(10) Patent No.: US 11,622,153 B2
(45) Date of Patent: Apr. 4, 2023

(54) CUSTOMIZED 360-DEGREE MEDIA VIEWING

(71) Applicant: InterDigital Madison Patent Holdings, SAS, Paris (FR)

(72) Inventors: Yong He, San Diego, CA (US); Yan Ye, San Diego, CA (US); Ali C. Begen, Konya (TR); Ahmed Hamza, Montreal (CA)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 16/753,691

(22) PCT Filed: Oct. 2, 2018

(86) PCT No.: PCT/US2018/053939
§ 371 (c)(1),
(2) Date: Apr. 3, 2020

(87) PCT Pub. No.: WO2019/070686
PCT Pub. Date: Apr. 11, 2019

(65) Prior Publication Data
US 2020/0275156 A1    Aug. 27, 2020

Related U.S. Application Data

(60) Provisional application No. 62/567,976, filed on Oct. 4, 2017, provisional application No. 62/691,316, filed on Jun. 28, 2018.

(51) Int. Cl.
*H04N 21/4545*    (2011.01)
*H04N 21/45*    (2011.01)
(Continued)

(52) U.S. Cl.
CPC ............... *H04N 21/45455* (2013.01); *H04N 21/4126* (2013.01); *H04N 21/4532* (2013.01); *H04N 21/45457* (2013.01); *H04N 21/84* (2013.01)

(58) Field of Classification Search
None
See application file for complete search history.

(56) References Cited

U.S. PATENT DOCUMENTS 8,523,667 B2    9/2013 Clavin et al.
10,455,184 B2    10/2019 Nashida
(Continued)

FOREIGN PATENT DOCUMENTS

CN    102221877 A    10/2011
CN    103703442 A    4/2014
(Continued)

OTHER PUBLICATIONS

Choi et al., "Text of ISO/IEC DIS 23090-2 Omnidirectional Media Format", ISO/IEC JTC1/SC29/WG11 N16824, Hobart, Australia, Apr. 2017, 63 pages.
(Continued)

*Primary Examiner* — William J Kim
(74) *Attorney, Agent, or Firm* — Smadar Gefen

(57) ABSTRACT

A device may be configured to render at least one spatial region of 360-degree media content, which may include two or more spatial regions. The device may include a receiver configured to receive the 360-degree media content and metadata associated with the 360-degree content. The metadata may include a classification of a respective spatial region of the 360-degree media content. The device may further include a memory configured to store a user preference and a sensor configured to detect a user movement. The device may include a processor configured to determine that the user movement is associated with a rendering of the
(Continued)

respective spatial region. The processor may further determine whether the classification complies with the user preference and alter the rendering of the respective spatial region if the classification violates the user preference.

11 Claims, 14 Drawing Sheets

(51) Int. Cl.
*H04N 21/84* (2011.01)
*H04N 21/41* (2011.01)

(56) References Cited

U.S. PATENT DOCUMENTS

| | | |
|---|---|---|
| 2011/0237324 A1 | 11/2011 | Clavin et al. |
| 2012/0092496 A1* | 4/2012 | Kozakura ........ G08B 13/19656 348/143 |
| 2012/0151390 A1 | 6/2012 | Trotta et al. |
| 2013/0291004 A1 | 10/2013 | Yuan et al. |
| 2013/0342570 A1 | 12/2013 | Kinnebrew et al. |
| 2014/0195651 A1 | 7/2014 | Stockhammer et al. |
| 2016/0110923 A1 | 4/2016 | Ur |
| 2016/0299563 A1 | 10/2016 | Stafford et al. |
| 2016/0300388 A1 | 10/2016 | Stafford et al. |
| 2016/0379413 A1 | 12/2016 | Yamamoto et al. |
| 2017/0325000 A1 | 11/2017 | Kitazato et al. |
| 2017/0336705 A1* | 11/2017 | Zhou ...................... G06T 15/10 |
| 2017/0339415 A1* | 11/2017 | Wang ..................... H04N 21/84 |
| 2017/0344843 A1* | 11/2017 | Wang ................. G06K 9/00744 |
| 2017/0347163 A1* | 11/2017 | Wang ................. H04N 21/8146 |
| 2018/0077451 A1* | 3/2018 | Yip .................. H04N 21/44008 |
| 2018/0154253 A1 | 6/2018 | Peterson et al. |
| 2018/0176468 A1* | 6/2018 | Wang ................. H04N 5/23238 |
| 2019/0075269 A1* | 3/2019 | Nashida ................. H04N 21/41 |
| 2019/0356938 A1* | 11/2019 | Gopalan .......... H04N 21/44218 |
| 2020/0128232 A1* | 4/2020 | Hwang ............. H04N 5/23293 |

FOREIGN PATENT DOCUMENTS

| | | |
|---|---|---|
| CN | 105992986 A | 10/2016 |
| GB | 2543320 A | 4/2017 |
| WO | WO2016084591 A1 | 6/2016 |
| WO | 2017/064502 A1 | 4/2017 |
| WO | 2017/102988 A1 | 6/2017 |
| WO | 2017/159063 A1 | 9/2017 |

OTHER PUBLICATIONS

Facebook Engineers, "Next Generation Video Encoding Techniques for 360 Video and VR", Available at <https://engineering.fb.com/virtual-reality/next-generation-video-encoding-techniques-for-360-video-and-vr/>, Jan. 2016, pp. 1-5.
ISO/IEC, "Coding of Audio Visual Objects Part 12: ISO Base Media File Format", ISO/IEC 14496-12, Feb. 2015, 248 pages.
ISO/IEC, "Information Technology—Dynamic Adaptive Streaming over HTTP (DASH)-Part 1: Media Presentation Description and Segment Formats", ISO/IEC 23009-1:2014(E), 2nd Edition, May 15, 2014, 152 pages.
Wikipedia, "Motion Picture Content Rating System", Available at <https://en.wikipedia.org/wiki/Motion_picture_content_rating_system>, pp. 1-20.

* cited by examiner

CUSTOMIZED 360-DEGREE MEDIA VIEWING

CROSS-REFERENCE TO RELATED APPLICATIONS

This application is the National Stage Entry under 35 U.S.C. § 371 of Patent Cooperation Treaty Application No. PCT/US2018/053939, filed Oct. 2, 2018, which claims the benefit of U.S. Provisional Application No. 62/567,976, filed Oct. 4, 2017, and titled Customized 360° Media Viewing, and claims the benefit of U.S. Provisional Application No. 62/691,316, filed Jun. 28, 2018, and titled Customized 360° Media Viewing, the contents of both of which are hereby incorporated herein by reference in their entirety.

BACKGROUND 360-degree video is an emerging and rapidly growing format in the media industry, facilitated by the growing availability of virtual reality (VR) devices. Part of 360-degree video's appeal is its ability to provide users with a dynamic viewing experience that provides a new sense of presence and increased control. In addition to being presented with high quality images via the display of a VR device, users can control what they are viewing by, for example, turning to the left or right, just as they would in the physical world. VR devices may detect such movements and then adjust the video display to present users with the view(s) that correspond to their physical movements. However, providing users with such an immersive viewing experience may pose new technical challenges when compared to rectilinear video, including how to further customize this dynamic video environment to accommodate users' different backgrounds, interests and/or preferences while still enabling the large amounts of data often associated with 360-degree video to be efficiently distributed via finite bandwidth resources.

SUMMARY

A device may be configured to render at least one spatial region of 360-degree media content, which may include two or more spatial regions. The device may include a receiver configured to receive the 360-degree media content and metadata associated with the 360-degree content. The metadata may include a classification of a spatial region of the 360-degree media content. The device may further include a memory configured to store a user preference and a sensor configured to detect a user movement. The device may include a processor configured to determine that the user movement is associated with a rendering of the respective spatial region. The processor may further determine whether the classification of the spatial region complies with the user preference and alter the rendering of the spatial region if the classification violates the user preference. The processor may alter the rendering via one or more of the following: by refraining from moving to the respective spatial region; by changing to a rectilinear projection format; or by altering the rendering by changing an aspect of the respective spatial region, such as by zooming out on the spatial region.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1:
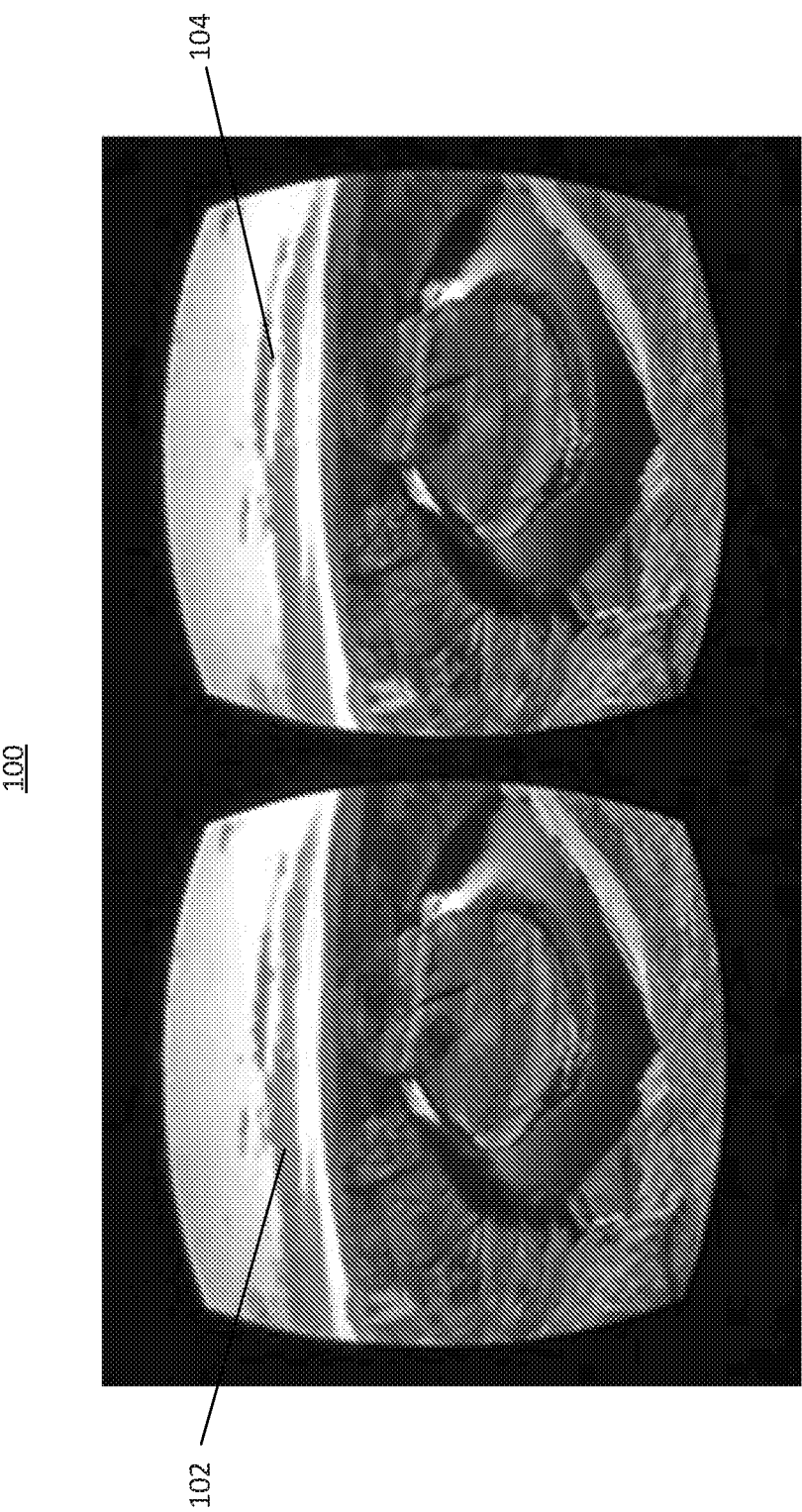
FIG. 1 illustrates an example portion of a 360-degree video displayed on a head mounted device (HMD).

FIG. 1 depicts a 360-degree video displayed on a head mounted device (HMD), which may include one or more sensors (not shown) for detecting a users movements, such as the movement of the user's head. As seen in FIG. 1, when viewing a 360-degree video, a user may be presented with a portion 100 of the video. The displayed portion 100 of the 360-degree video may be monoscopic, with one image directed to both eyes or, as shown in FIG. 1, stereoscopic in which two distinct images (e.g., images 102, 104) may be directed individually to each of the user's eyes. The displayed portion 100 may be changed when the user "looks around" and/or zooms in or out of the image. For example, the displayed portion 100 of the video may move to the right if one of the HMD's sensors detects that the user has turned her head to the right. The displayed portion 100 of the video may also be changed based on feedback provided by the HMD and/or other types of user interfaces, such as a wireless transmit/receive unit (WTRU). The displayed portion 100 of the 360-degree video may correspond to a single spatial region of the video or may include multiple spatial regions. The spatial region of the 360-degree video being displayed, or any portion(s) thereof, may be referred to as a viewport. The viewport may be presented, in full or in part, to the user. The presented viewport may have different qualities than other parts, or viewports, of the 360-degree video.

HyperText Transfer Protocol (HTTP) streaming has become a dominant approach in commercial deployments.

For instance, streaming platforms such as Apple's HTTP Live Streaming (HLS), Microsoft's Smooth Streaming (SS), and/or Adobe's HTTP Dynamic Streaming (HDS) may use HTTP streaming as an underlying video-delivery method. A standard for HTTP streaming of multimedia content may allow a standard-based client (e.g., a HMD) to stream content from any standard-based server, thereby enabling interoperability between servers and clients of different vendors. The Moving Picture Experts Group's (MPEG) Dynamic Adaptive Streaming over HTTP (MPEG-DASH) may be a universal delivery format that may provide end users with the best possible video experience by dynamically adapting to changing network conditions. DASH may be built on top of the ubiquitous HTTP/TCP/IP stack. DASH may define a manifest format, Media Presentation Description (MPD), and segment formats for ISO Base Media File Format and MPEG-2 Transport Streams.

Dynamic HTTP streaming may need various bit rate alternatives of a particular multimedia content to be available at a server. The multimedia content may include several media components, such as audio, video and text, and the media components may have different characteristics. In the case of MPEG-DASH, the characteristics may be described by MPD.

Figure 2:
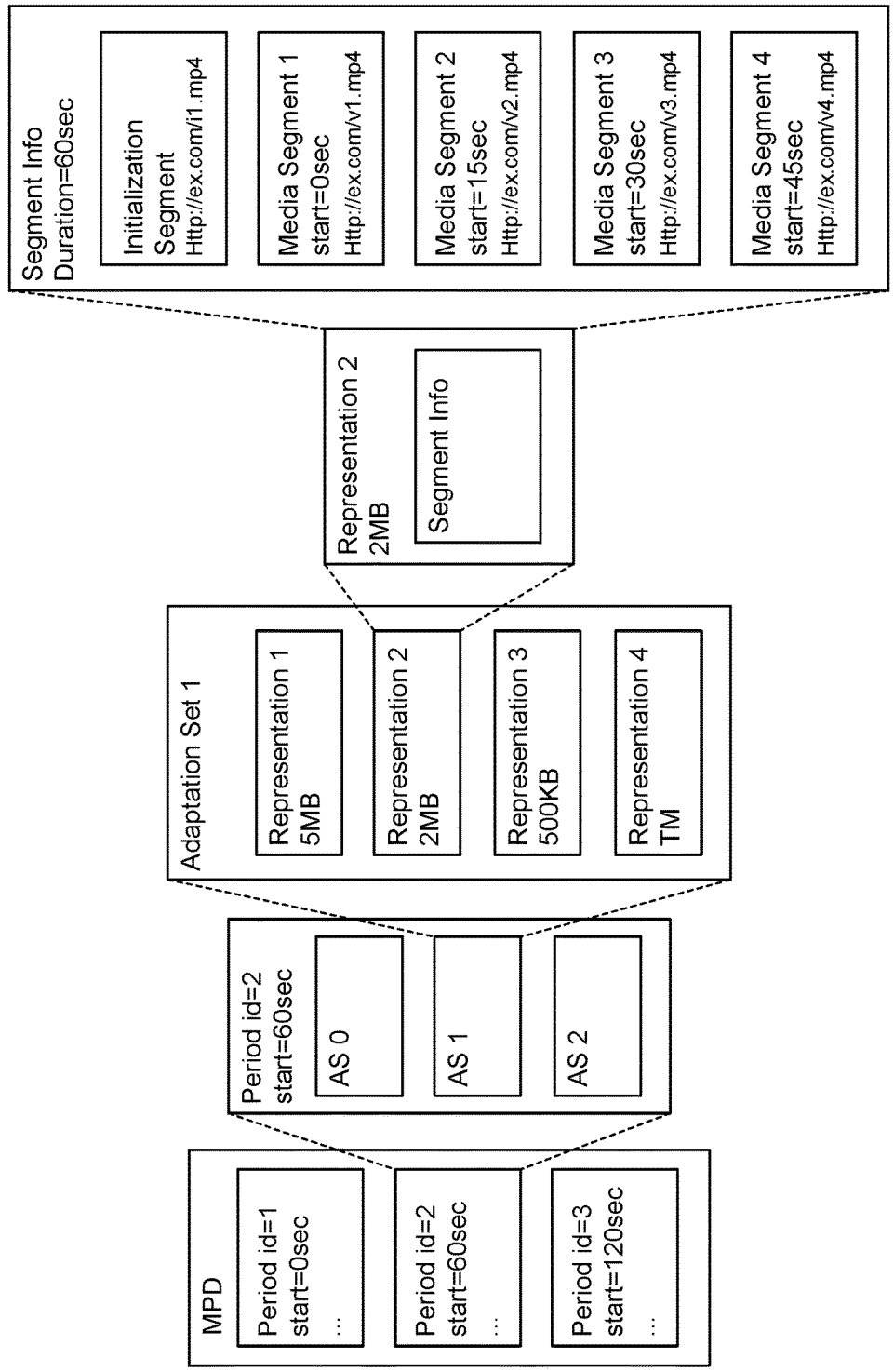
FIG. 2 illustrates an example media presentation description (MPD) data model.

The MPD may be an eXtensible Markup Language (XML) document, which may include metadata for a DASH client to construct appropriate HTTP-URLs to access video segments in an adaptive manner during streaming sessions. FIG. 2 depicts an example MPD hierarchical data model. The MPD may describe a sequence of Periods, such as Periods 1, 2 and 3 shown in FIG. 2. Within a particular Period, such as Period 2, there may be a consistent set of encoded versions of the media content. Each of the Periods 1, 2 and 3 may have a starting time and a duration. Each of the Periods 1, 2 and 3 may be composed of one or more AdaptationSets, such as AS 0, AS 1 and AS 2 in FIG. 2. In an embodiment, a DASH streaming client may be a WTRU as described below in connection with FIGS. 11A-11D.

An AdaptationSet may represent a set of encoded versions of one or several media content components sharing one or more identical properties, which may include language, media type, picture aspect ratio, role, accessibility, viewpoint, and/or rating property. For instance, the AdaptationSet may include different bitrates for the video component of the same multimedia content. The AdaptationSet may include different bitrates for the audio component (e.g., lower quality stereo and/or higher quality surround sound) of the same multimedia content. The AdaptationSet, such as AS 1 shown in FIG. 2, may include multiple Representations, such as Representations 1, 2, 3 and 4 also shown in FIG. 2.

A Representation may describe a deliverable encoded version of one or several media components, varying from other representations by bitrate, resolution, number of channels, and/or other characteristics. A representation may include one or more segments. Attributes of a Representation element (e.g., @id, @bandwidth, @qualityRanking, and @dependencyId) may be used to specify one or more properties of the associated Representation.

A Representation, such as Representation 2 shown in FIG. 2, may include Segment Info, which may further include an Initialization Segment and one or more Media Segments (e.g., Media Segments 1, 2, 3 and 4). The Initialization Segment and/or Media Segment may be retrieved with a HTTP request. The Initialization Segment and/or Media Segment may have a URL, such as an addressable location on a server, and/or may be downloaded using HTTP GET or HTTP GET with byte ranges.

A DASH client may parse an MPD XML document. The DASH client may select a collection of AdaptationSets suitable for its environment, for example, based on the AdaptationSets' elements. Within an AdaptationSet, the client may select a Representation. The client may select the Representation, for example, based on the value of @bandwidth attribute, client decoding capabilities, and/or client rendering capabilities. The client may download an initialization segment of the selected Representation. The client may access content, such as by requesting entire Media Segments or byte ranges of Media Segments. When the presentation has started, the client may continue consuming the media content. For example, the client may request (e.g., continuously request) Media Segments and/or parts of Media Segments during the presentation. The client may play content according to a media presentation timeline. The client may switch from a first Representation (e.g., Representation 1) to a second Representation (e.g., Representation 2), based on updated information from the client's environment. The client may play the content continuously across two or more Periods. When the client consumes media (e.g., renders the media for a user to view) contained in the Media Segments towards the end of the announced media in the Representation, the media presentation may be terminated, a Period may be started, and/or the MPD may be re-fetched.

The MPD descriptor element, Descriptor, may be provided to the application. The Descriptor may describe elements with the appropriate scheme information. Some specific Descriptors (e.g., content protection, role, accessibility, rating, viewpoint, frame packing, and UTC timing descriptor) may contain a @schemeIdUri attribute, perhaps to identify the relative scheme.

The MPD supplemental property descriptor element, SupplementalProperty, may contain metadata that may be used by the DASH client, perhaps to optimize processing.

The MPD essential property descriptor element, EssentialProperty, may contain metadata, perhaps for processing the containing element.

Figure 3:
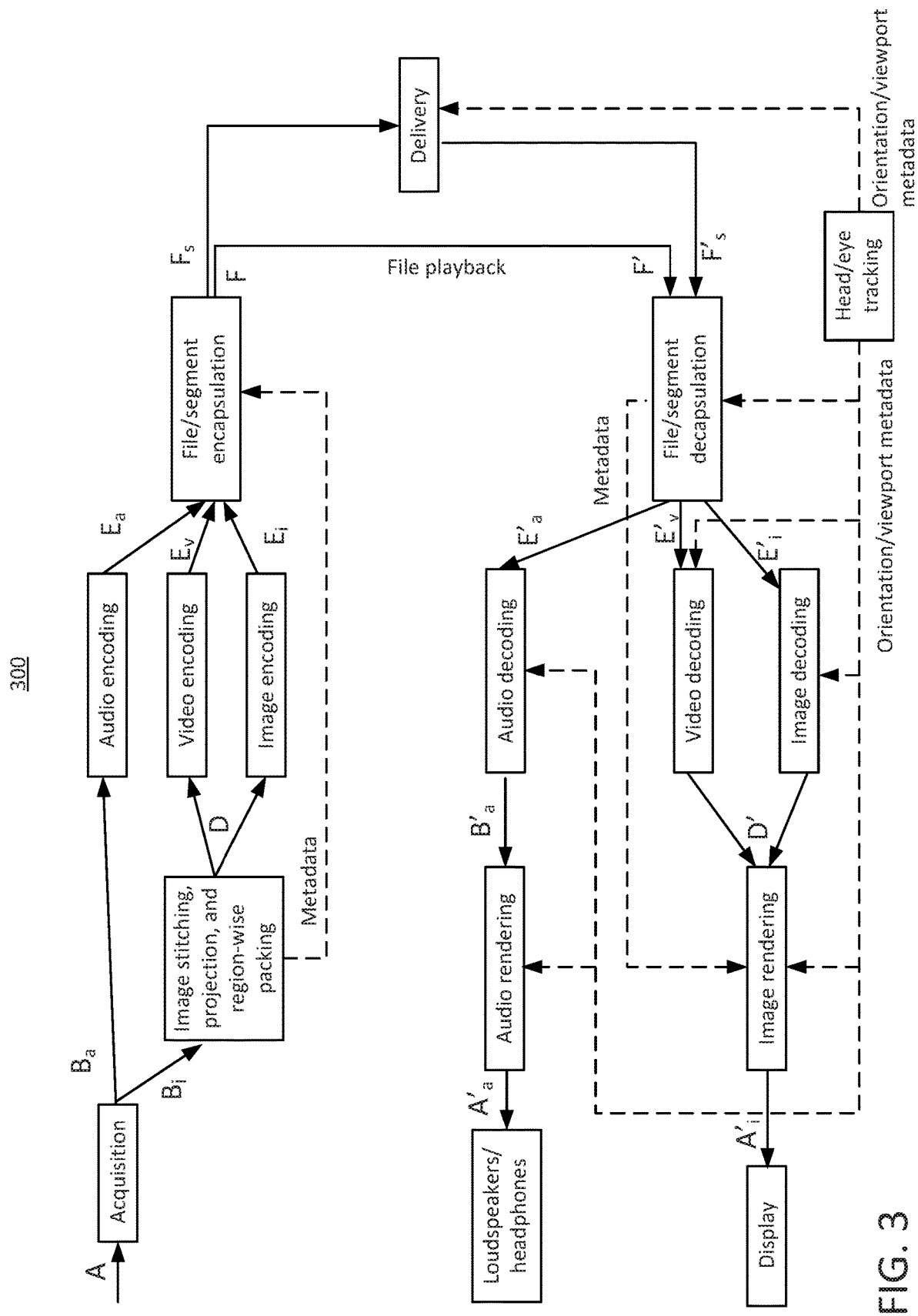
FIG. 3 illustrates an example content flow for an omnidirectional media application.

In omnidirectional application media format (OMAF), the following aspects may be defined: equirectangular projection format, metadata for interoperable rendering of 360-degree monoscopic and stereoscopic audio-visual data, storage format (e.g., ISO-base media file format (ISOBMFF)), and/or codecs (e.g., High Efficiency Video Coding (HEVC) and MPEG-H 3D audio). FIG. 3 illustrates an example content flow 300 for an omnidirectional media application.

As shown in FIG. 3, at step A an audio-visual scene may be captured by audio sensors, cameras, and/or a camera device with multiple lenses and sensors, which may result in a set of digital images/video and audio signals. The cameras and/or lenses may cover some or all directions around the center point of the camera set and/or camera device. For 360-degree video, input images of a time instance may be stitched at step $B_i$ to generate a projected picture representing a view. The projected picture may cover part of the 360-degree content. Region-wise packing may also be applied at step $B_i$, perhaps to map the projected picture onto a packed picture. The stitched images may be encoded as coded images and/or a coded video bitstream at step D. The captured audio may be encoded as an audio bitstream at step $B_a$. At steps $E_a$, $E_v$ and $E_i$, the coded images, video, and/or audio may be composed into a media file for file playback, or in a sequence of initialization segments and media segments for streaming, according to an example media container file format. The media container file format may be ISO base media file format (ISOBMFF). The file encapsulator may include metadata on the file and/or the segments (e.g., projection and region-wise packing information), which may assist in rendering the decoded packed pictures.

After delivery and/or during playback via a client: the file or sequence of segments may be decapsulated (steps F', F'$_s$); the audio, video and/or images may be decoded (steps E'$_a$, E'$_v$, E'$_i$); and the audio and/or images may be rendered (steps B'$_a$, D') via loudspeakers/headphones and/or a display (steps A'$_a$, A'$_i$).

Example metadata may include the projection format of the projected picture, fisheye video parameters, the area of the spherical surface covered by the projected picture, the orientation of the projection structure corresponding to the projected picture relative to the global coordinate axes, region-wise packing information, and/or region-wise quality ranking.

An example RegionOnSphereSample metadata structure may include:

```
aligned(8) RegionOnSphereStruct(range_included_flag) {
    signed int(32) center_yaw;
    signed int(32) center_pitch;
    singed int(32) center_roll;
    if (range_included_flag) {
        unsigned int(32) hor_range;
        unsigned int(32) ver_range;
    }
    unsigned int(1) interpolate;
    bit(7) reserved = 0;
}
aligned(8) RegionOnSphereSample( ) {
    for (i = 0; i < num_regions; i++)
        RegionOnSphereStruct(dynamic_range_flag) }
}
```

As described herein, RegionOnSphereStructure and SphereRegionStructure may be used interchangeably, and RegionOnSphereSample and SphereRegionSample may be used interchangeably.

Timed metadata may be described for a region, such as a spherical region. A timed metadata track may be indicated by a track sample entry type. For example, a track may be used to indicate a timed sequence of related samples. A timed metadata track may be used to indicate a timed sequence of metadata samples. An example SphereRegionSampleEntry and/or SphereRegionConfigBox may include:

```
class SphereRegionSampleEntry(type) extends MetaDataSampleEntry(type) {
    SphereRegionConfigBox( ); // mandatory
    Box[ ] other_boxes; // optional
}
class SphereRegionConfigBox extends FullBox('rosc', 0, 0) {
    unsigned int(8) shape_type;
    bit(7) reserved = 0;
    unsigned int(1) dynamic_range_flag;
    if (dynamic_range_flag == 0) {
        unsigned int(32) static_azimuth_range;
        unsigned int(32) static_elevation_range;
    }
    unsigned int(8) num_regions;
}
```

A timed metadata type may include a recommended viewport. The recommended viewport may indicate a viewport, which may be displayed, for example, when a user (e.g., and/or client) does not have and/or has released control of the content (e.g., control of the viewing orientation). Table 1 illustrates an exemplary list of viewport type values. As seen in Table 1, recommended viewports may be indicated by values of 0 and/or 1. For example, when a client (e.g., and/or user) releases control of the viewing orientation and selects a viewport type 0, a viewport as suggested by the content provider and/or content creator (e.g., a first recommended viewport) may be displayed to the user during the playback. When the client selects viewport type 1, the most popular viewport (e.g., a second recommended viewport) may be displayed to the user during the playback.

TABLE 1

| Viewport Type Value | Description |
| --- | --- |
| 0 | A recommended viewport per the director's cut, e.g., a viewport suggested according to the creative intent of the content author or content provider |
| 1 | A recommended viewport selected based on measurements of viewing statistics |
| 2 - 239 | Reserved (e.g., for use by future extensions of ISO/IEC 23090-2) |
| 240 - 255 | Unspecified (e.g., for use by applications or external specifications) |

In rectilinear video, elements of a video or scene may be arranged in front of the camera, perhaps based on a composition chosen by the director and/or based on the story the director wants to present to a viewer. As such, the viewer may view the video (e.g., the sequence of scenes and audio) in the manner chosen by the creator. The rectilinear video content may be post-edited to comply with certain regulations, such as programming ratings, restrictions and/or the cultural needs of viewers. For example, the video may be edited by removing certain language fragments or scenes, muting audio, inserting blackouts, blurring certain parts of the scene and the like. Viewers may then experience or view the post-edited version of the rectilinear video. Accordingly, numerous versions of the same content may be produced, perhaps to match the content in accordance with the varying rules, restrictions and/or preferences that may be associated with different user groups and/or geographical regions.

In 360-degree video, viewers may view different portions of the content by looking in different directions, such as by moving their heads in different directions at various temporal points in the video. Post-editing of a 360-degree video may be performed for any viewport permutation. For example, a young viewer watching 360-degree content may view a presentation that has a suitable rating for young viewers, such as PG-13, while an adult may view an R-rated or unrated presentation of the same content. This may be referred to content customization.

Content ratings may include any suitable system for classifying content for relevant viewers and/or audiences. For example, the Motion Picture Association of America (MPAA) utilizes a film rating system to rate the suitability of a movie for certain audiences based on the movie's content. The MPAA rating system may include G (general audiences), PG (parental guidance suggested), PG-13 (parents strongly cautioned), R (restricted), and/or NC-17 (adults only). A G rating may mean that the content is suitable for all ages and that nothing would offend parents for viewing by children. A PG rating may mean that some material may not be suitable for children and that parents are urged to give "parental guidance" as the movie may contain some material they may not like for their young children to view. A PG-13 rating may mean that some material may be inappropriate for children under 13 and that parents are urged to be cautious. An R rating may mean that anyone under 17 should be accompanied by a parent or adult guardian as the movie may contain some adult material. An R rating may further urge parents to learn more about the film before taking their children to view the movie. An NC-17 rating may mean that the movie includes some content that is not suitable anyone 17 or under.

Content ratings may include TV Parental Guidelines, which may classify the content of television shows. The TV Parental Guidelines ratings may include TV-Y (all children), TV-Y7 (older children), TV-Y7-FV (older children—fantasy violence), TV-G (general audiences), TV-PG (parental guidance suggested), TV-14 (parents strongly cautioned), and/or TV-MA (mature audiences only). The TV-Y rating may mean that the program is designed to be appropriate for all children. The TV-Y7 rating may mean that the program is designed for children age 7 and above. The TV-Y7-FV rating may mean that the program includes fantasy violence that may be more intense or more combative than other programs in the TV-Y7 category. The TV-G rating may mean that most parents would find the program suitable for all ages. The TV-PG rating may mean that the program includes material that parents may find unsuitable for younger children. The TV-14 rating may mean that the program includes some material that many parents would find unsuitable for children under 14 years of age. The TV-MA rating may mean that the program is specifically designed to be viewed by adults and therefore may be unsuitable for children under 17.

It will be appreciated that the MPAA and TV Parental Guidelines are examples of content rating systems and that other types of content classifications may be utilized in the disclosed embodiments.

In an embodiment, 360-degree media content may be multicast/broadcast in an unedited form (e.g., with all the possible viewports). A client device, such as a WTRU or HMD, may render the content appropriately according to a viewer's preferences. This may be referred to as dynamic content customization. In addition to, or in lieu of, being implemented in the client device, dynamic content customization may be implemented in the cloud, at a network edge, and/or in a home gateway device.

Figure 4:
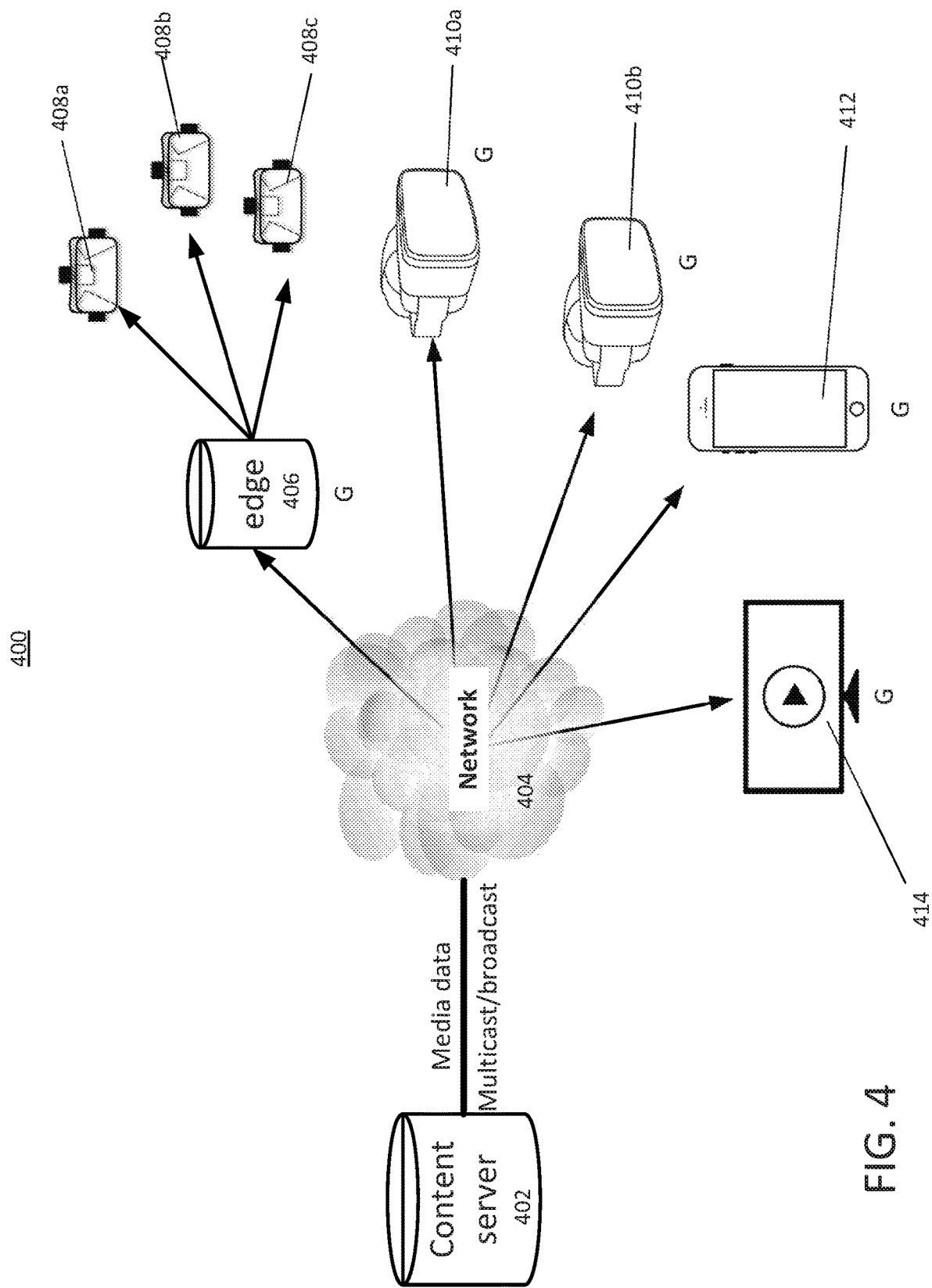
FIG. 4 illustrates an example multicast/broadcast architecture.

FIG. 4 illustrates an example architecture 400 for a video multicast/broadcast environment. The architecture 400 may include a content server 402, which may store multimedia content such as 360-degree videos. The architecture 400 may further include a network 404, which may be any type of wired or wireless network for communicating data, including multimedia content. In an embodiment, the network 404 may include a base station, a RAN, a core network, the Internet, an Intranet, and/or a public switch telephone network (PSTN) as described below in connection with FIGS. 11A-11D. As further shown in FIG. 4, the network 404 may be in communication with an edge server 406, which may be in communication with HMDs 408a, 408b, 408c. The network 404 may be in further communication with HMDs 410a, 410b, a WTRU 412, and/or a display unit 414.

In the example architecture 400, one or more viewports of 360-degree content stored on the content server 402 may be broadcast/multicast to multiple rendering devices, such as the HMDs 408a, 408b, 408c, 410a, 410b, the WTRU 412, and/or the display unit 414. The viewports may correspond to the same version of the content. For example, as shown in FIG. 4, viewers may watch the G-rated version of the content, which may be suitable for all audiences regardless of age.

Viewers may be able to change their respective viewport at any time via their respective rendering device, such as by making head movements that can be detected by the HMD 410a, for example. Viewers may have a customized virtual reality (VR) experience if a content source was capable of custom-tailoring content for viewers. For example, a content and/or service provider may provide cues intended to direct viewers to one or more desired viewports (e.g., a director's cut). Viewers may elect to view the director's cut, or other viewports. It will be appreciated that one or more of the viewers' preferences may change during a viewing session. As such, the backend system (e.g., the content server 402 and/or the network 404) may react to changes in viewing preferences so the cues are updated accordingly. Viewers may view viewports based on their respective ages, background, culture, present environment, present emotions, and the like. For example, a young viewer may use the HMD 408c to view a PG-13-rated version of the 360-degree content on the content server 402 while an adult viewer may use the HMD 410b to view an R-rated version of the content. Other viewers may, for example, view a version of the content where no use of tobacco and alcohol is shown and/or a version of the content that is devoid of vulgar language, which may have been removed based on a preselected list of vulgar words.

A customized VR experience may be provided by defining one or more content classifications of features that may exist in the 360-degree content. The features may be audio and/or video features (e.g., vulgar or offensive words and/or scenes with violence, substance abuse, nudity, sexual content, etc.). The 360-degree content may be analyzed for the delineated features. Metadata may be generated to include classifications to define or classify the features, their spatial location(s) and/or timing(s). The metadata may be stored and transmitted in a timed metadata track and/or a lookup table.

Table 2 illustrates example metadata for customizing 360-degree and/or VR content according to one or more content classifications, which may include content ratings, rating values and/or rating systems. The rating metadata may be structured such that, for a given rating value, video viewports and/or audio channels along the timeline sharing the same rating value may be specified. The viewports may specify a generic background area, (e.g., a non-viewport area) that may be associated with a default rating value.

TABLE 2

Example customization rating metadata

| Key | Type | Description |
|---|---|---|
| RegionCode | list | List of regions or countries |
| RatingSystem | list | List of rating systems |
| Rating | Array | The rating parameter |

TABLE 2-continued

Example customization rating metadata

| Key | Type | Description |
|---|---|---|
| VideoViewport | viewport | The region associated with the rating |
| AudioChannel | Integer | Audio channel associated with the rating |

RegionCode may specify the region or country in which the metadata applies. RatingSystem may specify the standard rating system utilized in the metadata (e.g., Motion Picture Association of America (MPAA) film rating system, Canadian Home Video Rating system, TV Parental guidelines, etc.). Rating may specify the rating value, such as G, PG, PG-13 or R defined by MPAA, or TV-Y, TV-Y7. TV-G or TV-MA defined by TV Parental Guidelines. VideoViewport may specify the viewport or spatial region of the content associated with the rating value. The position and size of the viewport may be defined by viewport data type, which may include parameters such as center_yaw, center_pitch, center_roll, static_hor_range, static_ver_range, hor_range and/or ver_range). AudioChannel may specify the audio channel associated with the rating.

A viewport may include additional camera positions and/or coordinates, such as x, y, and z. Table 3 illustrates an example viewport format definition.

TABLE 3

Example viewport format definition

| Key | Type | Description |
|---|---|---|
| viewport | Viewport | List of viewport view measurements during playout. |
| center_yaw | Integer | yaw coordinate of the center of the viewport |
| center_pitch | Integer | pitch coordinate of the center of the viewport |
| center_roll | Integer | roll coordinate of the center of the viewport |
| static_hor_range | Integer | horizontal range of the viewport region |
| static_ver_range | Integer | vertical range of the viewport region |
| center_x | Integer | x coordinate of the center of the sphere (camera position). |
| center_y | Integer | y coordinate of the center of the sphere (camera position). |
| center_z | Integer | z coordinate of the center of the sphere (camera position). |

Table 4 illustrates an example syntax for a rating customization metadata. The syntax may incorporate six degrees of freedom (6DoF) properties or coordinates. The 6DoFSample structure in Table 4 may be similar to the syntax elements defined in Table 3. A syntax flag, 6dof_included_flag, may be defined to indicate whether the rigid body or camera position is signaled in addition to three degrees of freedom (3DoF) coordinates.

TABLE 4

Example customization rating metadata syntax

```
aligned(8) 6DoFSample(range_included_flag, 6dof_included_flag) {
    RegionOnSphereStructure(range_ included_flag);
    if (6dof_included_flag) {
        signed int(32) center_x;
        signed int(32) center_y;
```

TABLE 4-continued

Example customization rating metadata syntax

```
        singed int(32) center_z;
    }
}
aligned(8) RatingSample( ) {
    unsigned int(32) entry;
    for (i = 0; i < entry; i++){
        unsigned int(32) RegionCode;
        unsigned int(32) RatingSystem;
        unsigned int(32) Rating;
        unsigned int(32) 6DoF;
        for (j = 0; j < 6DoF; j++)
            6DoFSample(6dof_included_flag);
        unsigned int(32) AudioChannels;
        for (j = 0; j < AudioChannels; j++)
            unsigned int(32) AudioChannelId;
    }
}
```

The entry syntax in Table 4 may specify the number of rating entries included in RatingSample. RegionCode may specify the region or country code. RatingSystem may specify the standard rating system the metadata complied with (e.g., MPAA, Canadian Home Video Rating system, TV Parental guidelines, etc.). Rating may specify a rating value (e.g., G, PG, PG-13 or R defined by MPAA, and/or TV-Y, TV-Y7. TV-G or TV-MA defined by TV Parental Guidelines). 6DoF may specify the number of 6DoF viewports associated with Rating. AudioChannels may specify the number of audio channels associated with Rating. AudioChannelId may specify the identifier of the audio channel.

Rating metadata may be defined for a viewport (e.g., per viewport), such as by way of the rating metadata structure shown in Table 5. For example, rating metadata may be specified for a viewport (e.g., per viewport).

TABLE 5

Example rating metadata sample syntax

```
aligned(8) RatingSample( ) {
    unsigned int(32) 6DoF;
    for (i = 0; i < 6DoF; i++){
        unsigned int(32) RegionCode;
        unsigned int(32) RatingSystem;
        unsigned int(32) Rating;
        6DoFSample(6dof_included_flag);
        unsigned int(32) AudioChannels;
        for (j = 0; j < AudioChannels; j++)
            unsigned int(32) AudioChannelId;
    }
}
```

Figure 5:
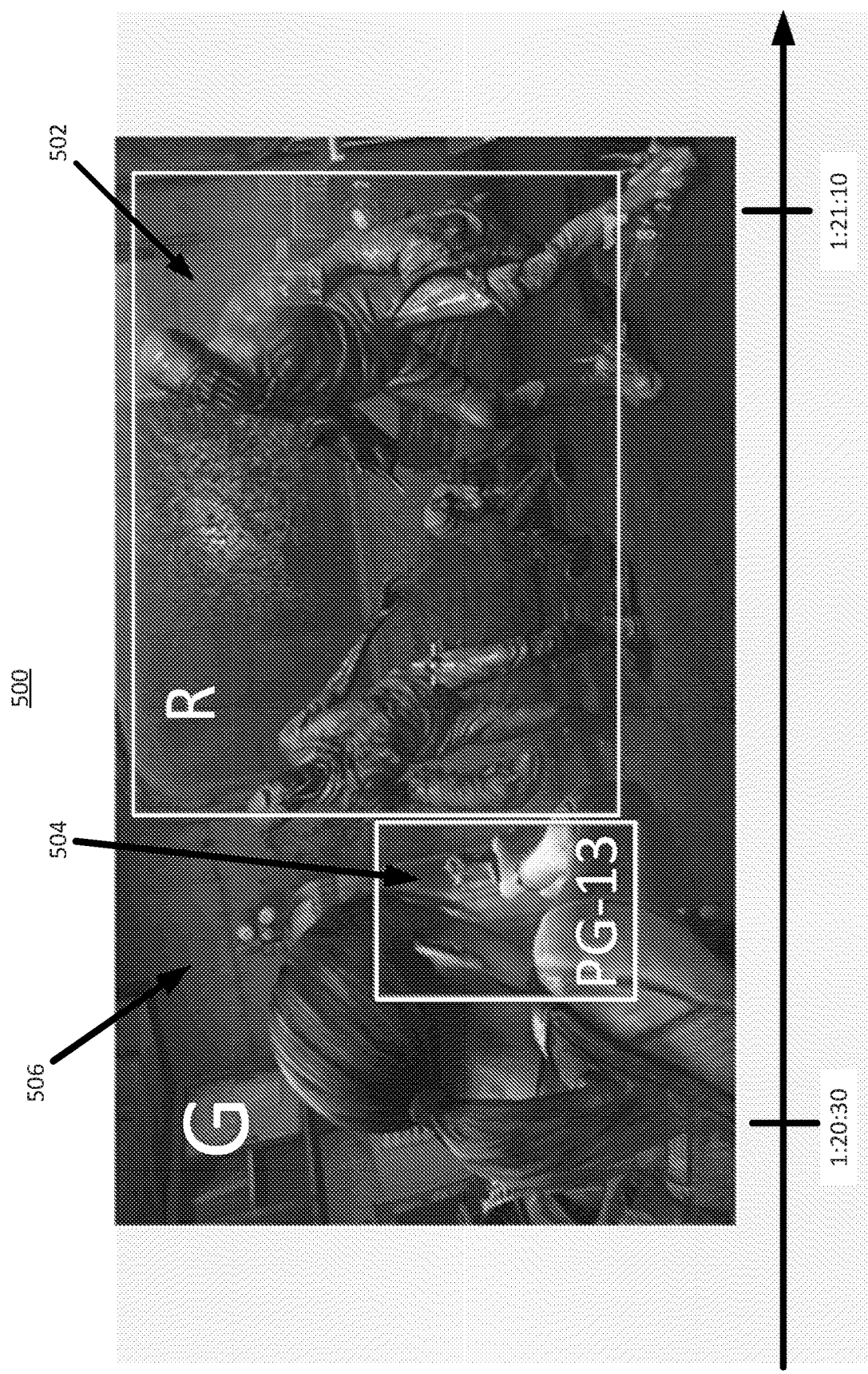
FIG. 5 illustrates an example 360-degree video with customization metadata.

FIG. 5 illustrates a displayed portion 500 of a video presentation with viewports 502, 504, 506. As seen in FIG. 5, the viewports 502, 504, 506 may each have a content rating. The viewport 502 may depict a scene with violence (e.g., zombies). As such, based upon an evaluation of suitable audiences, the viewport 502 may be assigned a content rating of R (or Restricted). The viewport 504 may also depict a scene with violence, although the level of violence may be deemed less severe (e.g., an image of someone pointing a gun). As such, the viewport 504 may be assigned a content rating of PG-13 (Parents Strongly Cautioned). The remaining portions of the display 500 (e.g., the viewport 506) may include images or content that is suitable for all viewers. As such, the viewport 506 may be assigned a content rating of G (General Audiences). As further shown in FIG. 5, the time associated with the ratings of the displayed portion 500 may be from 1:20:30 to 1:21:10.

An example value of a 3DoF or a 6DoF structure may be used to indicate a generic background instead of a specific viewport. This may be done, for example, by assigning a NULL value to the RegionOnSphereStructure( ) and/or center_x/center_y/center_z values. A NULL value may indicate a R. A RatingSample may be associated with a generic background area as the default rating of the content. As seen in FIG. 5, the generic background (e.g., the viewport 506) may have a default rating of G. If, for example, the viewer attempts to view the viewport 504 or the viewport 502 (in which case rating may be PG-13 or R, respectively), G may be applied as the default rating.

Metadata may be used to label a media chunk for its features. A media chunk may be a small piece of audio/video content that may be transmitted/consumed, e.g., independently. Labeling may be a scheme (e.g., bit marking) that may, for example, use SEI messaging and/or out-of-band signaling. The labels may be consumed by downstream elements (e.g., a cloud service, edge servers, home gateways, etc.) or rendering devices (e.g., HMDs, WTRUs, etc.).

The downstream elements or rendering devices may process the labeled media chunks to render them in accordance with viewer preferences. Metadata may be transmitted downstream in a timed metadata track. Downstream elements or rendering devices may consume the metadata and process it, e.g., according to viewer preferences.

Metadata may be generated by a content producer and may be mapped to a manifest file (e.g., DASH MPD) for video streaming. The classification (e.g., a rating value) of a viewport and/or audio channel may be signaled in MPD elements (e.g., EssentialProperty or SupplementalProperty) for the corresponding viewport representation (e.g., a tile segment). Table 6 illustrates an example MPD file using rating customization. The EssentialProperty descriptor with a @schemeIdUri attribute equal to "urn:mpeg:dash:scheme:rating" may signal the rating of each tile representation. As seen in Table 6, a viewport may be rated R, PG-13, and/or G. If, for example, a customization policy supports General Audiences (G), a matching viewport tile may be presented. Viewport segments that do not match or comply with the G rating (such as representations 1, 2, and/or 3 in Table 6) may be blurred, skipped, and/or may not be requested by the rendering device.

TABLE 6

Example MPD with rating customization

```xml
<?xml version="1.0" encoding="UTF-8"?>
<MPD
    xmlns:xsi="http://www.w3.org/2001/XMLSchema-instance"
    xmlns="urn:mpeg:dash:schema:mpd:2011"
    xsi:schemaLocation="urn:mpeg:dash:s chema:mpd:2011 DASH-MPD.xsd"
    [...]>
    <Period>
        <!-9 tiles -->
        <AdaptationSet [...]>
            <EssentialProperty schemeIdUri="urn:mpeg:dash:srd:2014"
                value="1, 0, 0, 1920, 1080, 5760, 3240"/>
            <EssentialProperty schemeIdUri = "urn:mpeg:dash:rating" value="R">
            <Representation id="1" bandwidth="5000000">
                <BaseURL>tile1.mp4</BaseURL>
            </Representation>
        </AdaptationSet>
        <AdaptationSet [...]>
            <EssentialProperty schemeIdUri="urn:mpeg:dash:srd:2014"
                value="1, 1920, 0, 1920, 1080"/>
            <EssentialProperty schemeIdUri="urn:mpeg:dash:rating" value="PG-13">
            <Representation id="2" bandwidth="5000000">
                <BaseURL>tile2.mp4</BaseURL>
            </Representation>
        </AdaptationSet>
        <AdaptationSet [...]>
            <EssentialProperty schemeIdUri="urn:mpeg:dash:srd:2014"
                value="1, 3840, 0, 1920, 1080"/>
            <EssentialProperty schemeIdUri="urn:mpeg:dash:rating" value="PG-13">
            <Representation id="3" bandwidth="5000000">
                <BaseURL>tile3.mp4</BaseURL>
            </Representation>
        </AdaptationSet>
        <AdaptationSet [...]>
            <EssentialProperty schemeIdUri="urn:mpeg:dash:srd:2014"
                value="1, 0, 1080, 1920, 1080"/>
            <EssentialProperty schemeIdUri="urn:mpeg:dash:rating" value="G">
            <Representation id="4" bandwidth="5000000">
                <BaseURL>tile4.mp4</BaseURL>
            </Representation>
        </AdaptationSet>
        ......
        <AdaptationSet [...]>
            <EssentialProperty schemeIdUri="urn:mpeg:dash:srd:2014"
                value="1, 3840, 2160, 1920, 1080"/>
            <EssentialProperty schemeIdUri="urn:mpeg:dash:rating" value="G">
            <Representation id="9" bandwidth="5000000">
                <BaseURL>tile9.mp4</BaseURL>
            </Representation>
```

TABLE 6-continued

Example MPD with rating customization

```
      </AdaptationSet>
   </Period>
</MPD>
```

Video content may change over time. As such, the classification and/or rating of a spatial region within a 360-degree video may change over time. One or more timed metadata track types may be specified to account for changes in a video's content over time, such as initial viewing orientation, recommended viewport, viewpoints, and/or timed text sphere location. Additional timed metadata tracks may be used and/or defined. For example, a timed metadata track type may be used to indicate a classification and rating viewport track, which may indicate a viewport that matches a users classification and/or rating selection or preference. A SphereRegionSampleEntry type, CrvpSampleEntry, may indicate a defined timed metadata track. As illustrated herein, a sphere region classification and rating timed metadata track may be indicated by the track sample entry type, "crvp," and/or may include:

```
class CrvpSampleEntry( ) extends SphereRegionSampleEntry('crvp') {
    unsigned int(8) region_code;
    unsigned int(8) rating_system_code;
    string default_rating_label; // optional
}
```

The parameter region_code may be used to indicate the region and/or countries associated with the classification and rating track. The parameter rating_system_code may be used to indicate an index associated with a pre-defined content rating system list, which may be associated with the classification and rating track. The parameter default_rating_label may be used to indicate the default rating label of a region (e.g., all regions). When a default_rating_label is not present, the default rating label may be set to "not rated", which may indicate the content is suitable for all audience (e.g., G for General Audience).

An exemplary format of a classification and rating viewport timed metadata track may include:

```
      class CrvpSample ( ) extends SphereRegionSample( ) {
            for (i=0; i < num_regions; i++) {
                  string rating_label;
            }
            remaining_region_rating_label; // optional
      }
```

The parameter rating_label may be used to indicate the rating label associated with a region (e.g., a region specified by SphereRegionStruct). A parameter rating_index, which may be an integer data type, may indicate an index associated with (e.g., an index of a value within) a pre-defined list of classification and rating labels. The parameter remaining_region_rating_label may indicate the rating label associated with a region not specified by SphereRegionSample. For example, when the remaining_region_rating_label is not present, the rating label for regions not specified by SphereRegionSample may be set to "not rated", which may indicate the content is suitable for all audience (e.g., G for General Audience).

CrvpSample may include a same rating flag, which may indicate the regions (e.g., all regions of the sample) share the same rating. For example, when the same rating flag is set to one, a shared rating label may be specified accordingly. CrvpSample may signal (e.g., may alternatively signal) an index of regions assigned the same rating label (e.g., in case multiple regions share the same rating label, which may save transmission overhead). For example, rating label signaling may include an index associated with (e.g., an index of a value within) a pre-defined list of classification and rating labels.

In the event the rating of a current viewport does not match a user's preferred rating, (e.g., a rating violation), the client device may customize the viewport presentation by, for example, blurring the current viewport's content and/or adding a mosaic effect over the current viewport's content to prevent the content from being seen by the viewer. The client may customize the viewport by presenting a viewport (e.g., the closest or most relevant viewport to the current viewport) that matches the user's preferred rating. This may be done by rotating the rendering coordinates. This may be done regardless of the viewer's viewing orientation.

A client device may parse the timed metadata of future content using, for example, a predefined look-ahead window. In particular, the client may parse the timed metadata of future content to determine whether the current viewport's future content matches the user's preferred rating to identify a potential rating violation. In anticipation of a rating violation (e.g., a violation in future content), the client may gradually shift the presentation from the current viewport's content to the content of another viewport (e.g., a neighboring viewport that matches the users preferred rating). For example, the client may determine or calculate a path for gradually shifting the presentation in anticipation of a rating violation. The client may move the viewport's coordinates along the determined path. The determined path may be based on the distance between the two viewports, the change in viewing orientation, and/or the amount of time until the rating violation will occur. The transition speed of the gradual shift in presentation (e.g., from the current viewport to a neighboring viewport that matches the users preferred rating) may also be based on the distance between the two viewports, the change in viewing orientation, and/or the amount of time until the rating violation will occur.

A recommended viewport track may be provided to a client device and/or user. For example, the recommended viewport track may allow the user to view certain content that most users watched. For example, recommended viewports may include a directors cut and/or may be based on a measurement of viewing statistics. Recommended viewport types may be defined based on the classification and/or rating of viewport content. Table 7 illustrates an exemplary list of recommended viewport types values and their accompanying descriptions. As described herein, the content rating system and/or rating value may be indicated in the viewport_description field of RcvpInfoBox.

TABLE 7

| Viewport Type Value | Description |
| --- | --- |
| 0 | A recommended viewport per the director's cut, e.g., a viewport suggested according to the creative intent of the content author or content provider |
| 1 | A recommended viewport selected based on measurements of viewing statistics |
| 2 | A recommended viewport per the content classification and rating. |
| 3 . . . 239 | Reserved (e.g., for use by future extensions of ISO/IEC 23090-2) |
| 240 . . . 255 | Unspecified (e.g., for use by applications or external specifications) |

An RcvpInfoBox structure may be used to indicate the content rating system and/or the associated rating value. A box type, ClassificationRatingBox, may include:

```
class ClassificationRatingBox extends FullBox('crif', 0, 0) {
    unsigned int(8) region_code;
    unsigned int(8) rating_system_code;
    unsigned int(8) rating_index;
}
```

As described herein, the ClassificationRatingBox box may be included in the RcvpInfoBox for the recommended viewport type. For example, the RcvpInfoBox may include:

```
class RcvpInfoBox extends FullBox('rvif', 0, 0) {
    unsigned int(8) viewport_type;
    string viewport_description;
    ClassificationRatingBox;      // optional
}
```

As described herein, when a user accepts the recommended classification and/or rating viewport for a given rating, the client may render the specified viewport of a viewpoint based on the timed metadata track, e.g., regardless of users viewing orientation.

Figure 6:
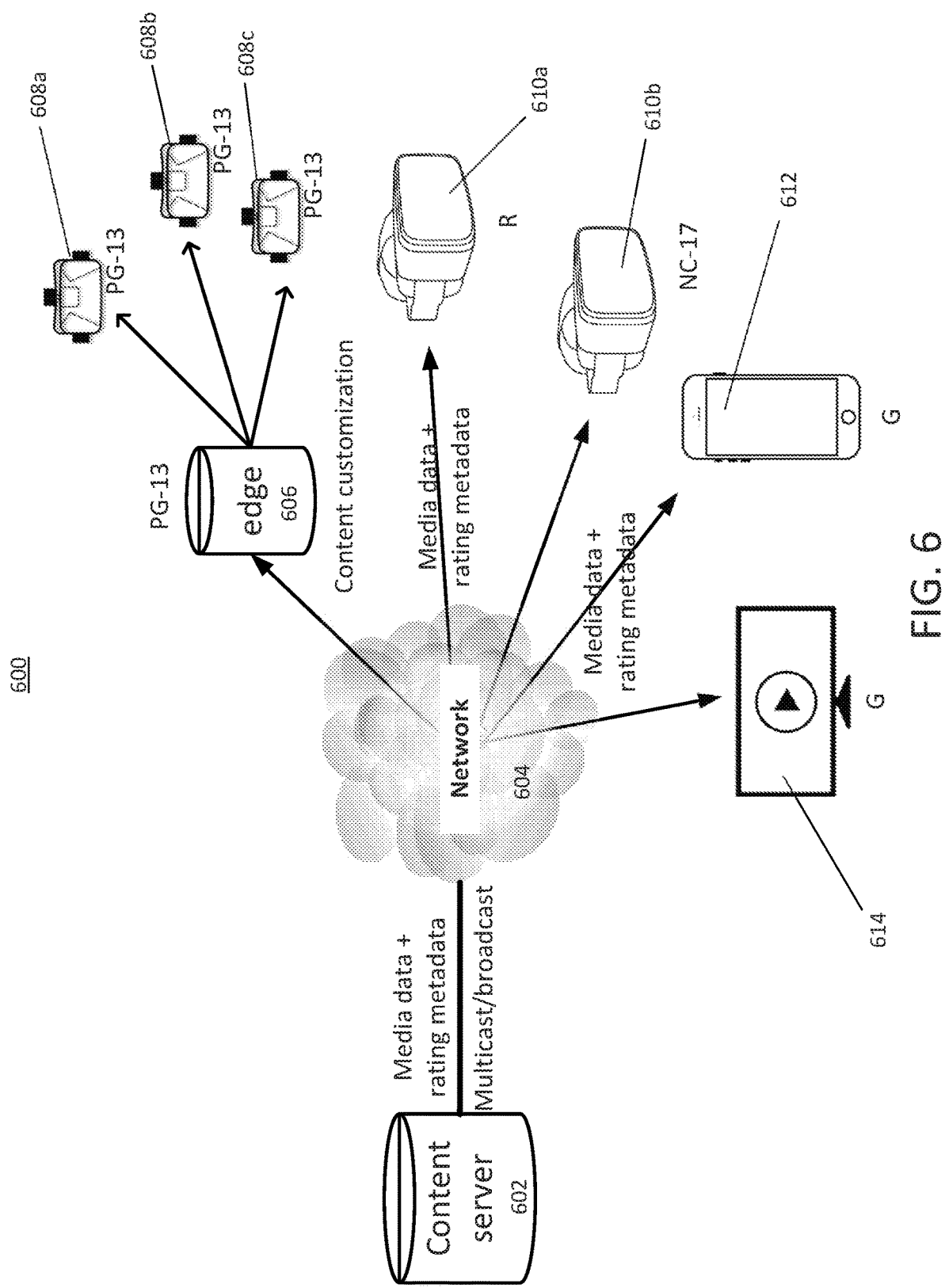
FIG. 6 illustrates an example virtual reality (VR) content customization architecture.

FIG. 6 illustrates an example multicast/broadcast architecture 600 for the customization of 360-degree video and/or VR content. In an embodiment, the architecture 600 may include a content server 602 for storing the 360-degree video. The content server 602 may also store metadata associated with the 360-degree video. The metadata may include rating information related to the video. The rating information may be associated with specific spatial regions, viewports and/or media chunks within the 360-degree video. For example, one or more viewports in the video may include a content rating of G, P-13, R and/or NC-17. The video and corresponding metadata may be provided to a network 604, which may be any type of wired or wireless network for communicating data, such as the 360-degree video. The network 604 may include a base station, a RAN, a core network, the Internet, an Intranet, and/or a public switch telephone network (PSTN) as described below in connection with FIGS. 11A-11D.

The network 604 may be in communication with an edge server 606, which may receive the 360-degree video and corresponding metadata from the network 604. The edge server 606 may process the content based on the rating information included in the metadata and based on user profiles or preferences, which may be stored in the edge server 606. For example, if the 360-degree video provided from the content server 602 includes viewports with a content rating of R and NC-17 and a user profile indicates that a viewer associated with the edge server 606 is under the age of seventeen, the edge server 606 may alter the viewports with the R and NC-17 ratings. The alterations by the edge server 606 may have the effect of changing the content rating of the 360-degree video. For example, the video may have a content rating of PG-13 post-processing by the edge server 606. The edge server 606 may then broadcast the customized PG-13 video to one or more rendering devices, such as HMDs 608a, 608b, 608c shown in FIG. 6.

Other rendering devices may receive the 360-degree video directly from the network 604. For example, the network 604 may be in communication with HMDs 610a, 610b, a WTRU 612 and/or a display unit 614. As such, the HMDs, 610a, 610b, the WTRU 612 and/or the display unit 614 may receive the 360-degree video and customize it according to one or more user profiles and preferences. For example, a user of the HMD 610b may be over the age of seventeen and may, therefore, prefer to view the 360-degree video in its original form from the content server 602. As such, the HMD 610b may not perform any processing on, or make any alterations to, the viewports in the 360-degree video that have been assigned R or NC-17 content ratings.

Other users' profiles or preferences may indicate a different content rating, such as R or G. For example, a user of the HMD 610a may have a profile that indicates NC-17 content is not suitable for the user. As such, the HMD 610a may alter the viewport(s) with the NC-17 rating, which may have the effect of changing the content rating of the 360-degree video rendered by the HMD 610a to R. Users of the WTRU 612 and the display units 614 may have respective profiles that indicate only G-rated content is suitable for the users. Accordingly, the WTRU 612 and the display unit 614 may alter the viewport(s) with PG-13, R and/or NC-17 ratings, which may have the effect of changing the content rating of the 360-degree video rendered by the WTRU 612 and the display unit 614 to G.

The rendering devices shown in FIG. 6 (e.g., the HMDs 608a, 608b, 608c, 610a, 610b, the WTRU 612 and/or the display unit 614) may include biometric verification capabilities, such as touch ID, face ID, iris scanner, and the like. The rendering devices may be utilized by multiple users, and, may store multiple user profiles and/or user preferences therein. In the event a respective user attempts to render the 360-degree video via one of the rendering devices, such as the HMD 610b, for example, the biometric verification capabilities of the device may be used to identify the user and link to or otherwise access that users respective personal profile and/or preferences.

Figure 7:
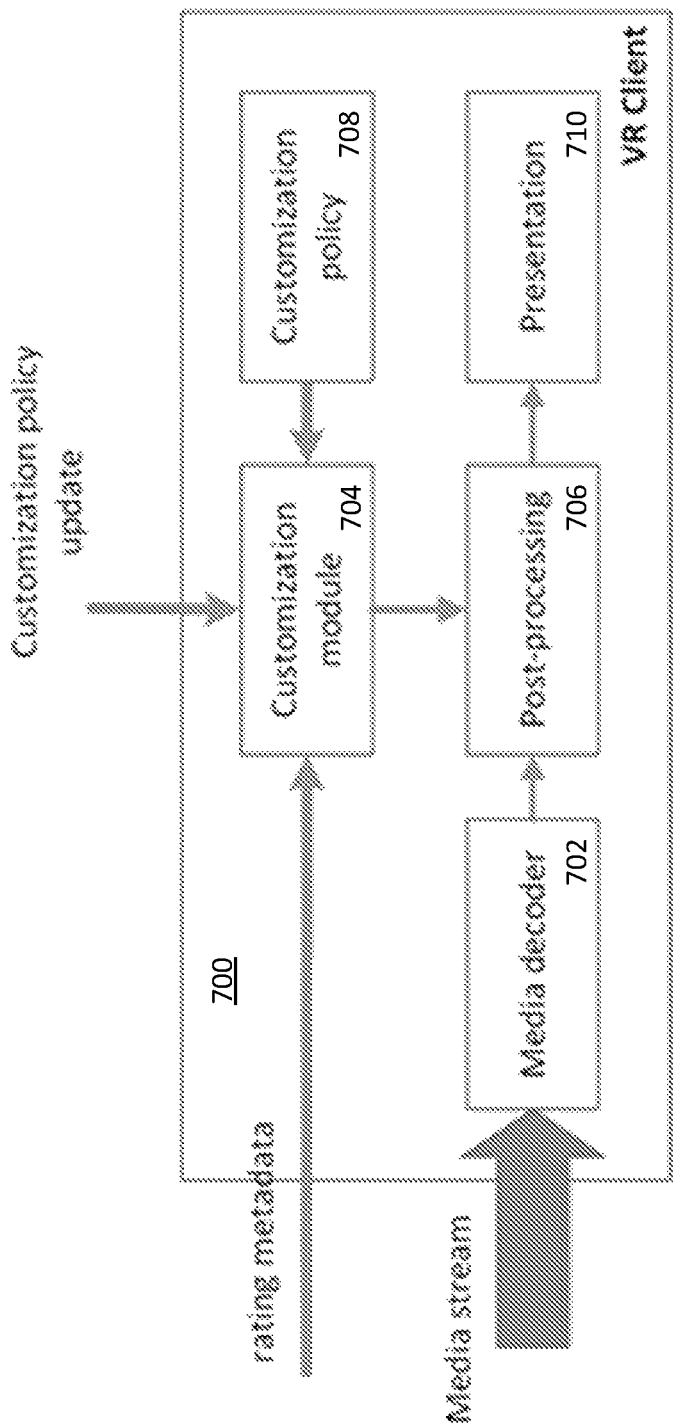
FIG. 7 illustrates a system diagram of an example client rendering device configured to customize content.

FIG. 7 illustrates a system diagram of an example client rendering device 700 that is configured to customize content, such as 360-degree videos and/or VR content. The client rendering device 700 may include a media decoder 702, a customization module 704, a post-processing module 706, a customization policy 708, and a presentation module 710. The media decoder 702 of the device 700 may receive a media stream associated with a 360-degree video and decode the media stream into media samples, media segments, and/or sample regions. The customization module 704 may receive metadata associated with the media stream (e.g., the 360-degree video). The metadata may include content rating information associated with the media stream, including the media samples, segments, and/or regions. The customization module 704 may compare the rating information with a customization policy, which may be stored in the customization policy module 708. The customization policy may be defined based on a user's preferences, which may include a users profile (e.g., the age of the user) and/or any information indicative of the type of content that is preferred by or suitable for the user. The rating information in the metadata may indicate the rating(s) of frames, segments, periods of content, spatial regions, and/or viewports within a time duration. The rating information in the metadata may also describe audio and/or video contents. Using the received metadata and the customization policy, the customization module 704 may direct or control a post-processing module 708, which may be configured to process and/or alter the received media samples, media segments, and/or sample regions to customize the 360-degree video and to ensure the customized video complies with the customization policy. The customized 360-degree video may then be rendered via the presentation module 710, which may include any suitable interface for displaying scenes or images of the customized 360-degree video.

It will be appreciated that the customization policy may be updated after any suitable period or on an as-needed basis. For example, if the customization policy is defined in accordance with the location of the user, the customization may be updated after the user moves to another location. As such, the user may be able to view different portions of the 360-degree video based on her location, which may be based on, or influenced by, local rules and regulations. The customization policy may also be periodically or aperiodically updated to reflect other changes to the users status. For example, if the customization policy reflects the user's status as a minor or child, the policy may be updated after the user becomes an adult (e.g., 18 or older). In an embodiment, a policy maker may broadcast one or more customization policies to client rendering devices, perhaps to update customization policies already stored on such devices.

As described above in connection with FIGS. 6 and 7, devices for rendering 360-degree videos and/or VR content may be configured to customize content by altering media samples, segments, media chunks, spatial regions, viewports, and the like based on classifications or rating information defined in metadata and based on profiles and/or preferences of the devices' users. The content may be altered in any manner that ensures users view content that complies with, or does not violate, their respective profiles and/or preferences.

For example, a rendering device, such as the HMD 610*a* shown in FIG. 6, may receive a 360-degree video and metadata associated with the video. The metadata may include classification information related to the 360-degree video, such as information related to one or more spatial regions of the video. The classification information may include content ratings, which may indicate the type of audience that is suited (or not suited) for a portion of the 360-degree video. For example, as described above, the content ratings may define audiences in terms of their ages. The HMD 610*a* may also store information indicative of a users profile or preferences in memory. Information in the profile or preferences may indicate the type of audience to which the respective user may belong. For example, the users profile or preferences may indicate the user's age.

During the process (or in anticipation) of rendering the video, a processor of the HMD 610*a* may detect a movement of the user via one or more sensors. The processor may determine that the user movement is associated with a rendering of a spatial region of the 360-degree video. The processor may determine whether the classification information in the metadata complies with the user preference stored in memory for the spatial region. The processor may alter the rendering of the spatial region if the classification violates the user preference. For example, if the user movement indicates that the user intends to turn to the right (e.g., by turning her head to the right), the processor may not respond to the user movement by refraining from rendering the spatial region. In particular, the processor may not move or transition the display from a currently rendered spatial region to the spatial region that violates the user preference. Audio associated with the respective spatial region may be muted or "bleeped out," e.g., if the audio violates the user preference.

When the processor determines that the rendering of the respective spatial region of the 360-degree video violates the user preference, the processor may move or transition the display to the respective spatial region of the 360-degree video but may obfuscate (e.g., "black out", cover, blur, distort, etc.) the region. The processor may obfuscate the entire respective spatial region and/or specific features, images, or scenes within the region. Audio associated with the respective spatial region may be muted or "bleeped out," e.g., if the audio violates the user preference.

Rating metadata of the respective spatial region may include alternative visual information (e.g., regions) and/or audio objects. As such, when the processor determines that the rendering of the respective spatial region of the 360-degree video violates the user preference, the processor may use the alternative visual information and/or audio objects to replace the relevant content of the respective spatial region. The alternative content may be a separate media track and/or another spatial region of the 360-degree video. The alternative visual information and/or audio objects may be determined by a content producer or director, perhaps to maintain a continuous storyline of the 360-degree video. DataEntryUmBox or RegionOnSphereSample may be used to indicate an alternative content source.

The processor may scan the 360-degree video to identify alternative visual information and/or audio objects that comply with the user preference. If more than one alternative is available, the device may select alternative visual information and/or audio objects closest in time and/or space to the respective spatial region that does not comply with the user preference. This may facilitate the continuity of the video and/or prevent or minimize sudden changes in scenes. The processor may reset the orientation coordinates to align the users head motion with the alternative visual information being presented. For example, if the user turns her head 10-degrees to the left (towards the respective spatial region) and the alternative visual information is located 60-degrees to the left, the processor may reset the user's motion orientation coordinate to 60-degrees so that the head motion matches the spatial region of the alternative visual information being presentation. In the event no alternative visual information and/or audio objects can be identified, the processor may fast forward (e.g., advance or skip over) the respective spatial region until the alternative visual information and/or audio objects may be identified.

A device may switch the presentation (e.g., temporarily) from 360-degree video to rectilinear video if, for example, the device detects that the users head motion may turn to a viewport that violates a customization policy. The 360-degree video may proceed according to a pre-defined sequence of viewports. The pre-defined sequence of viewports may be identified by the content producer in the rating metadata. The pre-defined sequence of viewports may also be determined by the processor of the rendering device by evaluating the rating information assigned to the viewports and selecting the sequence that complies with the user's profile and/or preferences. This may be enforced for a certain duration, perhaps depending on the offensive content's timeline (e.g. until the offensive content has passed).

The 360-degree video may be two-dimensional (2D), with one or more scenes or viewports having a perceived width and height. The 360-degree video may be three-dimensional (3D), with one or more scenes or viewports having a perceived width, height and depth. For example, the 360-degree video may be presented using stereoscopy or stereo imaging techniques in which two 2D images are offset and presented separately to the left and right eyes of the viewer. The 360-degree may be rendered on a 3D display (e.g., a volumetric display, a holographic display, an integral imaging display, or a compressive light field display). In the case of the 360-degree video being presented in 3D, the processor may change the presentation from 3D to 2D if the processor determines that the rendering of the respective spatial region of the 360-degree video violates the user preference. By changing to a 2D presentation, the graphic nature of the content deemed unsuitable for selected audiences may be deemphasized or reduced. For example, a violent scene may be perceived as less authentic or real when viewed in 2D versus 3D, which may make the content more suitable in view of the user preference.

Figure 8:
FIG. 8 illustrates an example zoom-out presentation.
Figure 8:

When the processor determines that the rendering of the respective spatial region of the 360-degree video violates the user preference, the processor may zoom out on the respective spatial region to deemphasize any content in the respective spatial region that may be violative of the user preference. FIG. 8 illustrates example spatial regions 802, 804. The content of the spatial region 802 may be deemed unsuitable for certain audiences in view of the graphic nature of the content. As such, rating information associated with the spatial region 802 may not comply with the user preference. By zooming out on the spatial region 802, the processor may render the spatial region 804, which may deemphasize or reduce the graphic nature of the content deemed unsuitable for selected audiences. Accordingly, the spatial region 804 may comply with the user preference.

The content of a spatial region that is deemed unsuitable for certain audiences may be located at the periphery of the spatial region. Thus, when the processor determines that the rendering of the respective spatial region of the 360-degree video violates the user preference, the processor may zoom in on the respective spatial region such that the unsuitable content is no longer within the spatial region that is being rendered to the user.

The processor may pre-fetch metadata along a 360-degree video's timeline to predict when unsuitable content may appear in a users current viewport. If the processor detects that unsuitable content may appear, the processor may switch the users viewport. This may avoid the predicted offensive content without the user turning her head. The processor may use a 4-dimensional map (e.g., a 3-D sphere along the time domain) to mark or label unsuitable content, and the unsuitable content may be blacked out or restricted.

The processor may present an alert, cue, or signal when it determines that the user's head motion may be approaching unsuitable content regions and/or when unsuitable content may appear in the current viewport. The alert, cur, or signal may be visual and/or audio, and may warn the user and/or indicate that the viewport may be changed. By detecting and/or identifying the viewport(s) with unsuitable content ahead of time, the processor may facilitate a smooth transition from one viewport to another while avoiding the unsuitable content.

The processor may enforce a default customization policy. This may be done if, for example, a user profile or user preference is not available.

The processor may highlight alternative viewports and/or insert cues or signals into the 360-degree video to attract the user to an alternative viewport. This may encourage the user to avoid the unsuitable content. The highlighted alternative viewports may attract the users attention towards viewports that comply with the user preference.

A client may present content (e.g., dynamically present content) based on a user's viewing preference. The client's user interface (UI) may provide users with the option to indicate the user's content viewing preference (e.g., less intense or more intense rated content). When the user indicates a preference for intense content, the client may render the intense content in slow motion and/or may enhance the quality of regions with intense content. For example, the client may enhance the quality of regions with intense content by scaling up the region to fill the entire viewport, and/or motion tracking the intense content for the presentation (e.g., regardless of user's viewing orientation). Dynamically presenting content based on a user's viewing preferences may be applicable, for example, in VR gaming. For example, a VR game may be rated "teen" by default (e.g., the most intense content in the game may be rated suitable for teenagers). If the user selects to go up to a "mature" rating, the client may present a "teen"-rated viewport with a higher level (e.g., "mature" level) of violence.

A client device may include any device that supports VR functionality, including, for example, orientation detection. The device may be a VR device, such as an HMD. The device may include a WTRU as described herein with respect to FIGS. 11A-11D. A customization policy may switch a user to media samples or regions for emergency events such as amber alerts, disaster alerts and/or traffic accident alerts to users in particular locations.

A network node (e.g., a streaming server, a content delivery node (CDN), edge server, etc.) may customize video content prior to delivering the video content, which may include sensitive content, to end users. Customization of video content prior to content delivery may be applicable, for example, in VR streaming to multiple countries/regions. For example, a country may have more restrictions on sensitive content than other countries. A gateway node located in the country having more restrictions (e.g., the first server inside that country to receive the live streaming content) may parse the rating metadata described herein to determine the rating(s) associated with the content prior to delivery of the content. The gateway node may remove and/or process restricted content (e.g., those tracks or segments that include restricted viewport content) based on the parsed metadata prior to delivering the content (e.g., via broadcast and/or unicast) to the end users within that country. A client that does not support classification and rating metadata may not render the sensitive tracks and/or user preferences may be overridden to conform with the regional laws.

Figure 9:
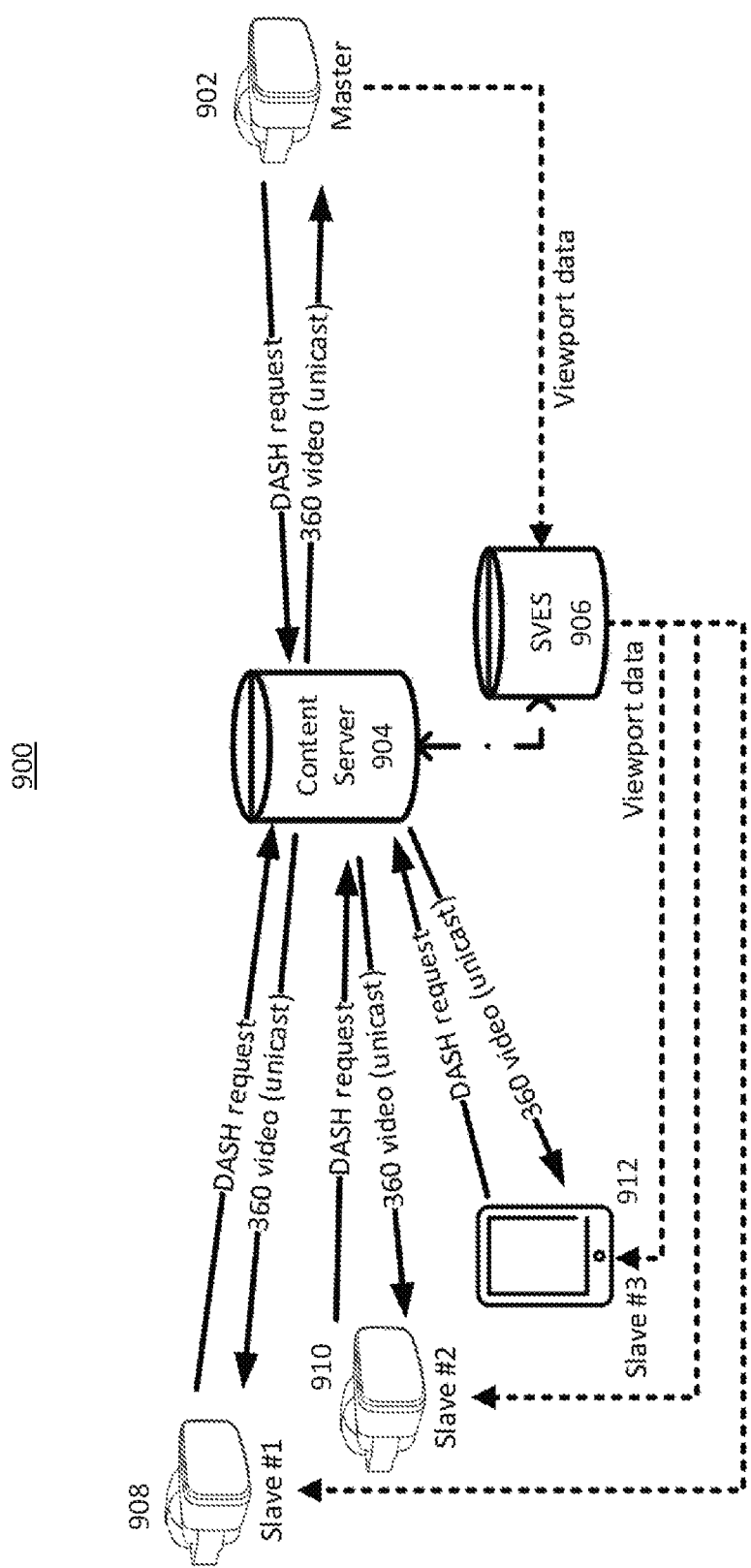
FIG. 9 illustrates an example architecture for social VR environments.

FIG. 9 illustrates an example architecture 900 for a social VR environment. As seen in FIG. 9, a user of a master viewer 902 may view a 360-degree video, which may be stored on a content server 904. When viewing the 360-degree video, the user may choose a sequence of viewports within the video based on movements detected by the master viewer 902, thereby producing a customized video. The sequence of viewports chosen by the user of the master viewer 902 may be recorded for playback on the master viewer 902 and/or by users of slave viewers 908, 910, 912.

The recorded sequence may be available for concurrent playback and/or playback at a later time. Orientation data or viewport data may be stored in a shared virtual experience server (SVES) 906. When viewing the sequence of viewports recorded by the master viewer 902, the users of the slave viewers 908, 910, 912 may not need to make any movements (e.g., change their head direction) as the slave viewers 908, 910, 912 may automatically change the viewport(s) according to the recorded sequence.

The viewing preferences for the master viewer 902 and one or more of the slave viewers 908, 910, 912 may not be the same. The slave viewers 908, 910, 912 may watch what the master viewer 902 is watching but, perhaps based on respective user preferences, the slave viewers 908, 910, 912 may alter the recorded sequence of viewports.

Figure 10:
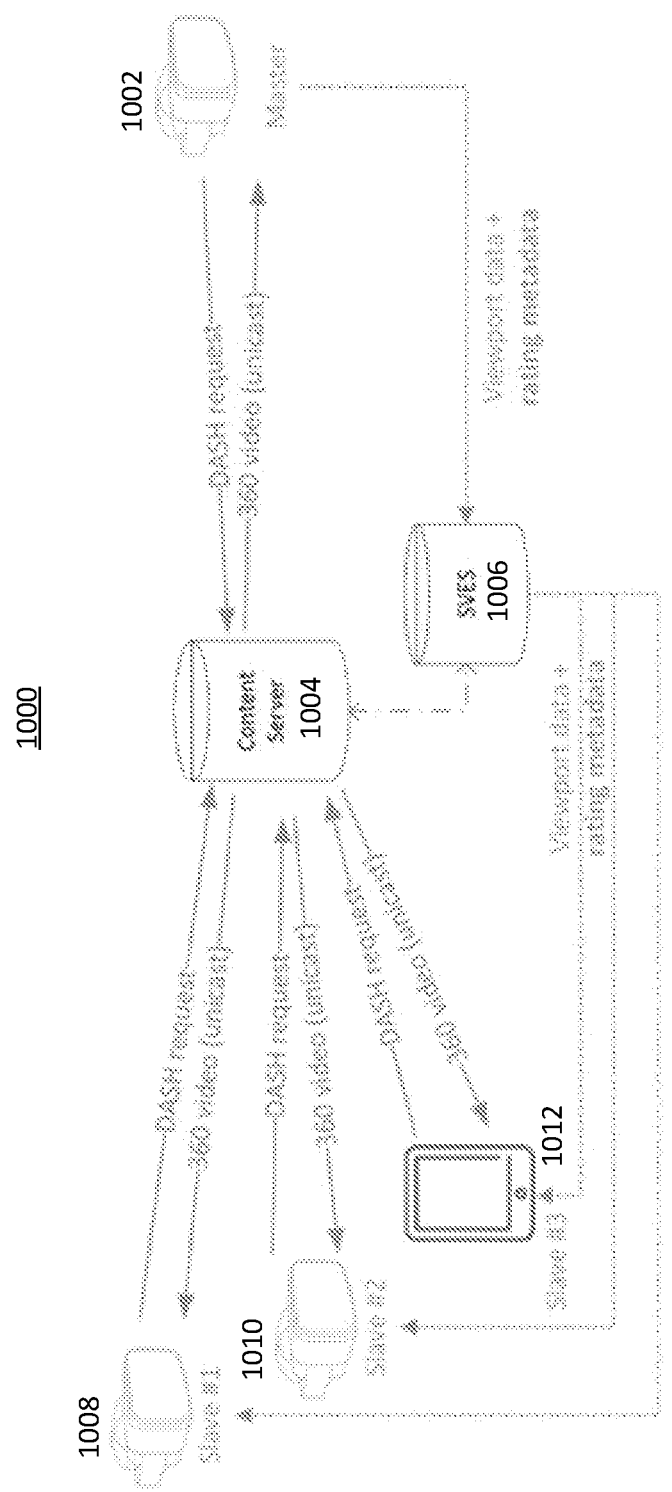
FIG. 10 illustrates an example architecture for social VR environments configured for content customization.

For example, FIG. 10 illustrates an example architecture 1000 for a social VR environment that utilizes rating metadata. Like the master viewer 902 shown in FIG. 9, a user of a master viewer 1002 may view a 360-degree video, which may be stored on a content server 1004. When viewing the 360-degree video, the user may choose a sequence of viewports within the video based on movements detected by the master viewer 1004. The sequence of viewports chosen by the user of the master viewer 1002 may be recorded for playback on the master viewer 1002 and/or by users of slave viewers 1008, 1010, 1012. The recorded sequence may be available for concurrent playback and/or playback at a later time. Orientation data or viewport data may be stored in a shared virtual experience server (SVES) 1006. When viewing the sequence of viewports recorded by the master viewer 1002, the users of the slave viewers 1008, 1010, 1012 may not need to make any movements (e.g., change their head direction) as the slave viewers 1008, 1010, 1012 may automatically change the viewport(s) according to the recorded sequence.

In addition to recording a sequence of viewports, the master view 1002 may generate and/or signal rating metadata that is associated with the recorded sequence. As shown in FIG. 10, the master viewer 1002 may send the generated rating metadata to the SVES 1006, which may make the rating metadata available to one or more of the slave viewers 1008, 1010, 1012. The master viewer 1002 may forward the rating metadata directly to the slave viewers 1008, 1010, 1012. This may enable each of the slave viewers 1008, 1010, 1012 to configure or alter the playback of the 360-degree video in accordance with the respective users' preferences and/or customization policy.

One or more of the users of the slave viewers 1008, 1010, 1012 may indicate their preferences in a profile, perhaps during registration or session initialization with the SVES 1006. The SVES 1006 may analyze the recorded sequence from master viewer 1002 and classify segments, spatial regions, viewports, chunks, etc. based on a feature list (e.g., assign ratings based on the content). The SVES 1006 may alter the rendering of any of the segments, spatial regions, viewports, chunks, etc. in the recorded sequence if they violate the users' preferences. The users of the slave viewers 1008, 1010, 1012 may then view the recorded sequence via the SVES 1006 in accordance with their respective user preferences. In addition, the SVES 1006 may send the classifications (e.g., rating metadata) to the slave viewers 1008, 1010, 1012, which may alter the rendering in accordance with the respective user's preferences.

Figure 11A:
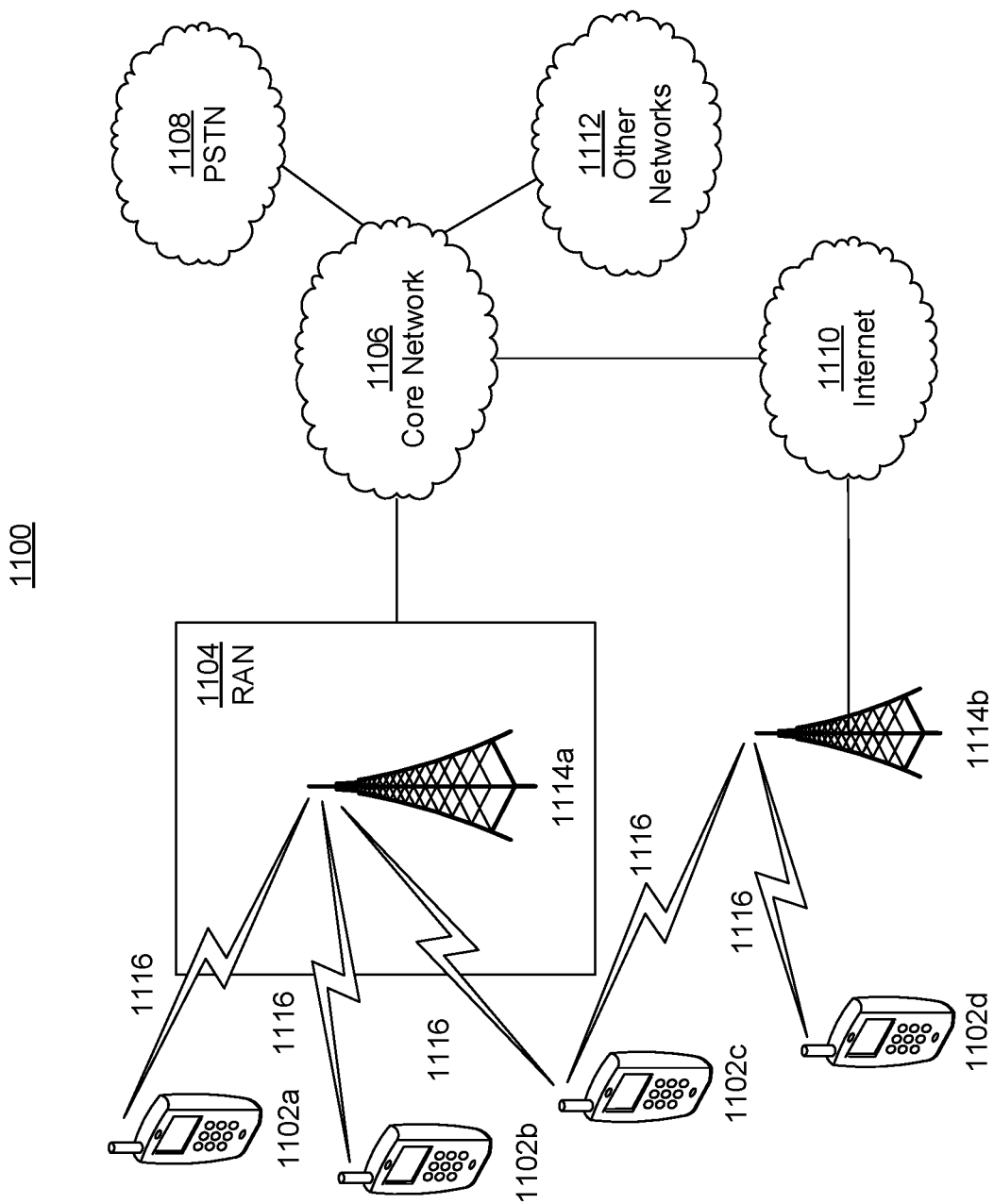
FIG. 11A is a system diagram of an example communications system in which one or more disclosed embodiments may be implemented.

FIG. 11A is a diagram illustrating an example communications system 1100 in which one or more disclosed embodiments may be implemented. The communications system 1100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 1100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 11A, the communications system 100 may include wireless transmit/receive units (WTRUs) 1102a, 1102b, 1102c, 1102d, a RAN 1104/1113, a CN 1106/1115, a public switched telephone network (PSTN) 1108, the Internet 1110, and other networks 1112, though it will be appreciated that the disclosed embodiments contemplate any number of WTRUs, base stations, networks, and/or network elements. Each of the WTRUs 1102a, 1102b, 1102c, 1102d may be any type of device configured to operate and/or communicate in a wireless environment. By way of example, the WTRUs 1102a, 1102b, 1102c, 1102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g. remote surgery), an industrial device and applications (e.g. a robot and/or other wireless devices operating in an industrial and/or an automated processing chain contexts), a consumer electronics device, a device operating on commercial and/or industrial wireless networks, and the like. Any of the WTRUs 1102a, 1102b, 1102c and 1102d may be interchangeably referred to as a UE.

The communications systems 1100 may also include a base station 1114a and/or a base station 1114b. Each of the base stations 1114a, 1114b may be any type of device configured to wirelessly interface with at least one of the WTRUs 1102a, 1102b, 1102c, 1102d to facilitate access to one or more communication networks, such as the CN 1106/1115, the Internet 1110, and/or the other networks 1112. By way of example, the base stations 1114a, 1114b may be a base transceiver station (BTS), a Node-B, an eNode B, a Home Node B, a Home eNode B, a gNB, a NR NodeB, a site controller, an access point (AP), a wireless router, and the like. While the base stations 1114a, 1114b are each depicted as a single element, it will be appreciated that the base stations 1114a, 1114b may include any number of interconnected base stations and/or network elements.

The base station 1114a may be part of the RAN 1104/1113, which may also include other base stations and/or network elements (not shown), such as a base station controller (BSC), a radio network controller (RNC), relay nodes, etc. The base station 1114a and/or the base station 1114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 1114*a* may be divided into three sectors. Thus, in one embodiment, the base station 1114*a* may include three transceivers, i.e., one for each sector of the cell. In an embodiment, the base station 1114*a* may employ multiple-input multiple output (MIMO) technology and may utilize multiple transceivers for each sector of the cell. For example, beamforming may be used to transmit and/or receive signals in desired spatial directions.

The base stations 1114*a*, 1114*b* may communicate with one or more of the WTRUs 1102*a*, 1102*b*, 1102*c*, 1102*d* over an air interface 1116, which may be any suitable wireless communication link (e.g. radio frequency (RF), microwave, centimeter wave, micrometer wave, infrared (IR), ultraviolet (UV), visible light, etc.). The air interface 1116 may be established using any suitable radio access technology (RAT).

More specifically, as noted above, the communications system 1100 may be a multiple access system and may employ one or more channel access schemes, such as CDMA, TDMA, FDMA, OFDMA, SC-FDMA, and the like. For example, the base station 1114*a* in the RAN 1104/1113 and the WTRUs 1102*a*, 1102*b*, 1102*c* may implement a radio technology such as Universal Mobile Telecommunications System (UMTS) Terrestrial Radio Access (UTRA), which may establish the air interface 1115/1116/1117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 1114*a* and the WTRUs 1102*a*, 1102*b*, 1102*c* may implement a radio technology such as Evolved UMTS Terrestrial Radio Access (E-UTRA), which may establish the air interface 1116 using Long Term Evolution (LTE) and/or LTE-Advanced (LTE-A) and/or LTE-Advanced Pro (LTE-A Pro).

In an embodiment, the base station 1114*a* and the WTRUs 1102*a*, 1102*b*, 1102*c* may implement a radio technology such as NR Radio Access, which may establish the air interface 1116 using New Radio (NR).

In an embodiment, the base station 1114*a* and the WTRUs 1102*a*, 1102*b*, 1102*c* may implement multiple radio access technologies. For example, the base station 1114*a* and the WTRUs 1102*a*, 1102*b*, 1102*c* may implement LTE radio access and NR radio access together, for instance using dual connectivity (DC) principles. Thus, the air interface utilized by WTRUs 1102*a*, 1102*b*, 1102*c* may be characterized by multiple types of radio access technologies and/or transmissions sent to/from multiple types of base stations (e.g. an eNB and a gNB).

In other embodiments, the base station 1114*a* and the WTRUs 1102*a*, 1102*b*, 1102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1114*b* in FIG. 11A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g. for use by drones), a roadway, and the like. In one embodiment, the base station 1114*b* and the WTRUs 1102*c*, 1102*d* may implement a radio technology such as IEEE 802.11 to establish a wireless local area network (WLAN). In an embodiment, the base station 1114*b* and the WTRUs 1102*c*, 1102*d* may implement a radio technology such as IEEE 802.15 to establish a wireless personal area network (WPAN). In yet another embodiment, the base station 1114*b* and the WTRUs 1102*c*, 1102*d* may utilize a cellular-based RAT (e.g. WCDMA, CDMA2000, GSM, LTE, LTE-A, LTE-A Pro, NR etc.) to establish a picocell or femtocell. As shown in FIG. 11A, the base station 1114*b* may have a direct connection to the Internet 1110. Thus, the base station 1114*b* may not be required to access the Internet 1110 via the CN 1106/1115.

The RAN 1104/1113 may be in communication with the CN 1106/1115, which may be any type of network configured to provide voice, data, applications, and/or voice over internet protocol (VoIP) services to one or more of the WTRUs 1102*a*, 1102*b*, 1102*c*, 1102*d*. The data may have varying quality of service (QoS) requirements, such as differing throughput requirements, latency requirements, error tolerance requirements, reliability requirements, data throughput requirements, mobility requirements, and the like. The CN 1106/1115 may provide call control, billing services, mobile location-based services, pre-paid calling, Internet connectivity, video distribution, etc., and/or perform high-level security functions, such as user authentication. Although not shown in FIG. 11A, it will be appreciated that the RAN 1104/1113 and/or the CN 1106/1115 may be in direct or indirect communication with other RANs that employ the same RAT as the RAN 1104/1113 or a different RAT. For example, in addition to being connected to the RAN 1104/1113, which may be utilizing a NR radio technology, the CN 1106/1115 may also be in communication with another RAN (not shown) employing a GSM, UMTS, CDMA 2000, WiMAX, E-UTRA, or WiFi radio technology.

The CN 1106/1115 may also serve as a gateway for the WTRUs 1102*a*, 1102*b*, 1102*c*, 1102*d* to access the PSTN 1108, the Internet 1110, and/or the other networks 1112. The PSTN 1108 may include circuit-switched telephone networks that provide plain old telephone service (POTS). The Internet 1110 may include a global system of interconnected computer networks and devices that use common communication protocols, such as the transmission control protocol (TCP), user datagram protocol (UDP) and/or the internet protocol (IP) in the TCP/IP internet protocol suite. The networks 1112 may include wired and/or wireless communications networks owned and/or operated by other service providers. For example, the networks 1112 may include another CN connected to one or more RANs, which may employ the same RAT as the RAN 1104/1113 or a different RAT.

Some or all of the WTRUs 1102*a*, 1102*b*, 1102*c*, 1102*d* in the communications system 1100 may include multi-mode capabilities (e.g. the WTRUs 1102*a*, 1102*b*, 1102*c*, 1102*d* may include multiple transceivers for communicating with different wireless networks over different wireless links). For example, the WTRU 1102*c* shown in FIG. 11A may be configured to communicate with the base station 1114*a*, which may employ a cellular-based radio technology, and with the base station 1114*b*, which may employ an IEEE 802 radio technology.

Figure 11B:
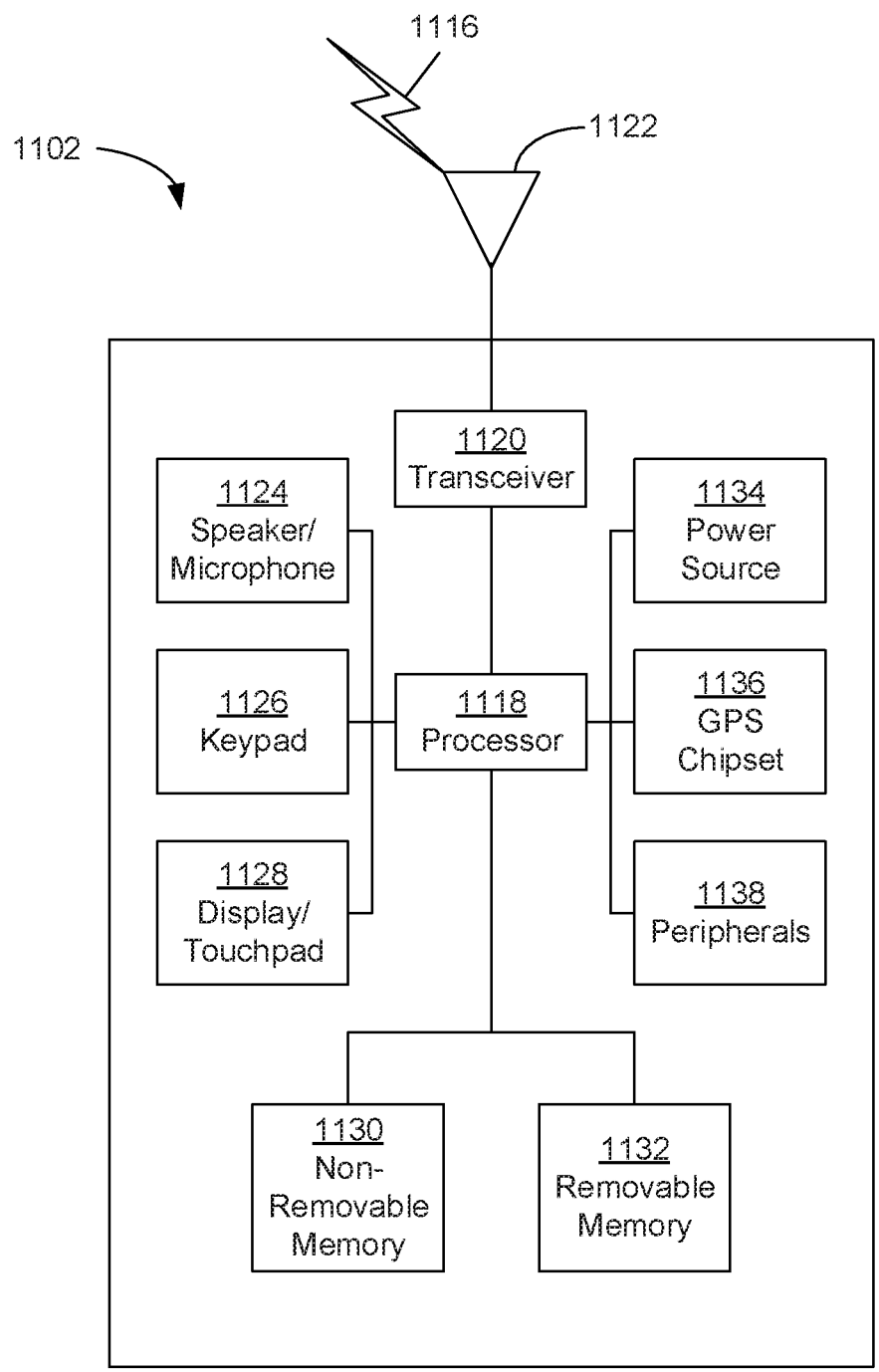
FIG. 11B is a system diagram of an example wireless transmit/receive unit (WTRU) that may be used within the communications system illustrated in FIG. 11A.

FIG. 11B is a system diagram illustrating an example WTRU 1102. As shown in FIG. 11B, the WTRU 1102 may include a processor 1118, a transceiver 1120, a transmit/ receive element 1122, a speaker/microphone 1124, a keypad 1126, a display/touchpad 1128, non-removable memory 1130, removable memory 1132, a power source 1134, a global positioning system (GPS) chipset 1136, and/or other peripherals 1138, among others. It will be appreciated that the WTRU 1102 may include any sub-combination of the foregoing elements while remaining consistent with an embodiment.

The processor 1118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 1118 may perform signal coding, data processing, power control, input/output processing, and/or any other functionality that enables the WTRU 1102 to operate in a wireless environment. The processor 1118 may be coupled to the transceiver 1120, which may be coupled to the transmit/receive element 1122. While FIG. 11B depicts the processor 1118 and the transceiver 1120 as separate components, it will be appreciated that the processor 1118 and the transceiver 1120 may be integrated together in an electronic package or chip.

The transmit/receive element 1122 may be configured to transmit signals to, or receive signals from, a base station (e.g. the base station 1114a) over the air interface 1116. For example, in one embodiment, the transmit/receive element 1122 may be an antenna configured to transmit and/or receive RF signals. In an embodiment, the transmit/receive element 1122 may be an emitter/detector configured to transmit and/or receive IR, UV, or visible light signals, for example. In yet another embodiment, the transmit/receive element 1122 may be configured to transmit and/or receive both RF and light signals. It will be appreciated that the transmit/receive element 1122 may be configured to transmit and/or receive any combination of wireless signals.

Although the transmit/receive element 1122 is depicted in FIG. 11B as a single element, the WTRU 1102 may include any number of transmit/receive elements 1122. More specifically, the WTRU 1102 may employ MIMO technology. Thus, in one embodiment, the WTRU 1102 may include two or more transmit/receive elements 1122 (e.g. multiple antennas) for transmitting and receiving wireless signals over the air interface 1116.

The transceiver 1120 may be configured to modulate the signals that are to be transmitted by the transmit/receive element 1122 and to demodulate the signals that are received by the transmit/receive element 1122. As noted above, the WTRU 1102 may have multi-mode capabilities. Thus, the transceiver 1120 may include multiple transceivers for enabling the WTRU 1102 to communicate via multiple RATs, such as NR and IEEE 802.11, for example.

The processor 1118 of the WTRU 1102 may be coupled to, and may receive user input data from, the speaker/microphone 1124, the keypad 1126, and/or the display/touchpad 1128 (e.g. a liquid crystal display (LCD) display unit or organic light-emitting diode (OLED) display unit). The processor 1118 may also output user data to the speaker/microphone 1124, the keypad 1126, and/or the display/touchpad 1128. In addition, the processor 1118 may access information from, and store data in, any type of suitable memory, such as the non-removable memory 1130 and/or the removable memory 1132. The non-removable memory 1130 may include random-access memory (RAM), read-only memory (ROM), a hard disk, or any other type of memory storage device. The removable memory 1132 may include a subscriber identity module (SIM) card, a memory stick, a secure digital (SD) memory card, and the like. In other embodiments, the processor 1118 may access information from, and store data in, memory that is not physically located on the WTRU 1102, such as on a server or a home computer (not shown).

The processor 1118 may receive power from the power source 1134, and may be configured to distribute and/or control the power to the other components in the WTRU 1102. The power source 1134 may be any suitable device for powering the WTRU 1102. For example, the power source 1134 may include one or more dry cell batteries (e.g. nickel-cadmium (NiCd), nickel-zinc (NiZn), nickel metal hydride (NiMH), lithium-ion (Li-ion), etc.), solar cells, fuel cells, and the like.

The processor 1118 may also be coupled to the GPS chipset 1136, which may be configured to provide location information (e.g. longitude and latitude) regarding the current location of the WTRU 1102. In addition to, or in lieu of, the information from the GPS chipset 1136, the WTRU 1102 may receive location information over the air interface 1116 from a base station (e.g. base stations 1114a, 1114b) and/or determine its location based on the timing of the signals being received from two or more nearby base stations. It will be appreciated that the WTRU 1102 may acquire location information by way of any suitable location-determination method while remaining consistent with an embodiment.

The processor 1118 may further be coupled to other peripherals 1138, which may include one or more software and/or hardware modules that provide additional features, functionality and/or wired or wireless connectivity. For example, the peripherals 1138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 1138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 1102 may include a full duplex radio for which transmission and reception of some or all of the signals (e.g. associated with particular subframes for both the UL (e.g. for transmission) and downlink (e.g. for reception) may be concurrent and/or simultaneous. The full duplex radio may include an interference management unit to reduce and or substantially eliminate self-interference via either hardware (e.g. a choke) or signal processing via a processor (e.g. a separate processor (not shown) or via processor 1118). In an embodiment, the WRTU 1102 may include a half-duplex radio for which transmission and reception of some or all of the signals (e.g. associated with particular subframes for either the UL (e.g. for transmission) or the downlink (e.g. for reception).

Figure 11C:
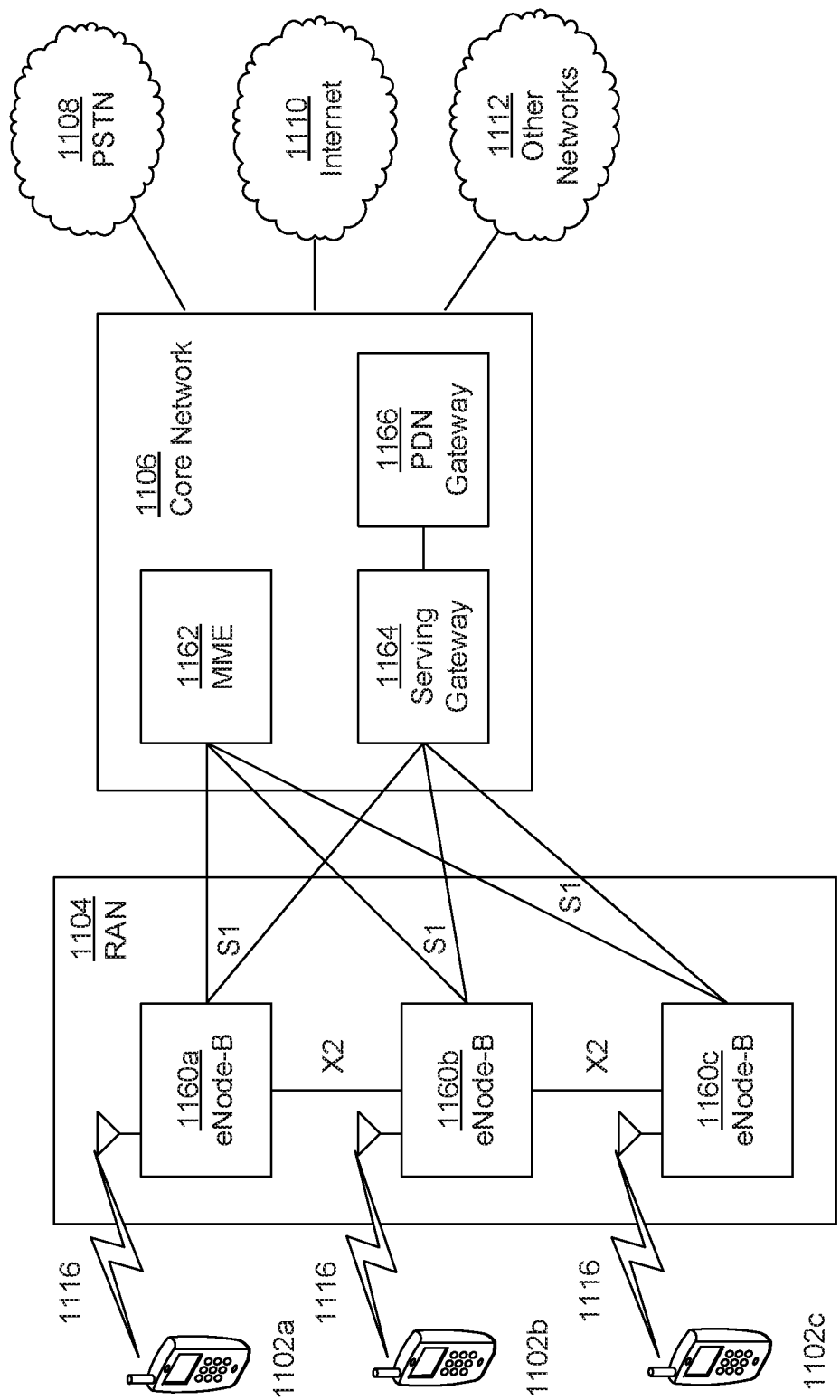
FIG. 11C is a system diagram of an example radio access network (RAN) and an example core network (CN) that may be used within the communications system illustrated in FIG. 11A.

FIG. 11C is a system diagram illustrating the RAN 1104 and the CN 1106 according to an embodiment. As noted above, the RAN 1104 may employ an E-UTRA radio technology to communicate with the WTRUs 1102a, 1102b, 1102*c* over the air interface 1116. The RAN 1104 may also be in communication with the CN 1106.

The RAN 1104 may include eNode-Bs 1160*a*, 1160*b*, 1160*c*, though it will be appreciated that the RAN 1104 may include any number of eNode-Bs while remaining consistent with an embodiment. The eNode-Bs 1160*a*, 1160*b*, 1160*c* may each include one or more transceivers for communicating with the WTRUs 1102*a*, 1102*b*, 1102*c* over the air interface 1116. In one embodiment, the eNode-Bs 1160*a*, 1160*b*, 1160*c* may implement MIMO technology. Thus, the eNode-B 160*a*, for example, may use multiple antennas to transmit wireless signals to, and/or receive wireless signals from, the WTRU 1102*a*.

Each of the eNode-Bs 1160*a*, 1160*b*, 1160*c* may be associated with a particular cell (not shown) and may be configured to handle radio resource management decisions, handover decisions, scheduling of users in the UL and/or DL, and the like. As shown in FIG. 11C, the eNode-Bs 1160*a*, 1160*b*, 1160*c* may communicate with one another over an X2 interface.

The CN 1106 shown in FIG. 11C may include a mobility management entity (MME) 1162, a serving gateway (SGW) 1164, and a packet data network (PDN) gateway (or PGW) 1166. While each of the foregoing elements are depicted as part of the CN 1106, it will be appreciated that any of these elements may be owned and/or operated by an entity other than the CN operator.

The MME 1162 may be connected to each of the eNode-Bs 1162*a*, 1162*b*, 1162*c* in the RAN 1104 via an S1 interface and may serve as a control node. For example, the MME 1162 may be responsible for authenticating users of the WTRUs 1102*a*, 1102*b*, 1102*c*, bearer activation/deactivation, selecting a particular serving gateway during an initial attach of the WTRUs 1102*a*, 1102*b*, 1102*c*, and the like. The MME 1162 may provide a control plane function for switching between the RAN 1104 and other RANs (not shown) that employ other radio technologies, such as GSM and/or WCDMA.

The SGW 1164 may be connected to each of the eNode Bs 1160*a*, 1160*b*, 1160*c* in the RAN 1104 via the S1 interface. The SGW 1164 may generally route and forward user data packets to/from the WTRUs 1102*a*, 1102*b*, 1102*c*. The SGW 1164 may perform other functions, such as anchoring user planes during inter-eNode B handovers, triggering paging when DL data is available for the WTRUs 1102*a*, 1102*b*, 1102*c*, managing and storing contexts of the WTRUs 1102*a*, 1102*b*, 1102*c*, and the like.

The SGW 1164 may be connected to the PGW 1166, which may provide the WTRUs 1102*a*, 1102*b*, 1102*c* with access to packet-switched networks, such as the Internet 1110, to facilitate communications between the WTRUs 1102*a*, 1102*b*, 1102*c* and IP-enabled devices.

The CN 1106 may facilitate communications with other networks. For example, the CN 1106 may provide the WTRUs 1102*a*, 1102*b*, 1102*c* with access to circuit-switched networks, such as the PSTN 1108, to facilitate communications between the WTRUs 1102*a*, 1102*b*, 1102*c* and traditional land-line communications devices. For example, the CN 1106 may include, or may communicate with, an IP gateway (e.g. an IP multimedia subsystem (IMS) server) that serves as an interface between the CN 1106 and the PSTN 1108. In addition, the CN 1106 may provide the WTRUs 1102*a*, 1102*b*, 1102*c* with access to the other networks 1112, which may include other wired and/or wireless networks that are owned and/or operated by other service providers Although the WTRU is described in FIGS. 11A-11D as a wireless terminal, it is contemplated that in certain representative embodiments that such a terminal may use (e.g. temporarily or permanently) wired communication interfaces with the communication network.

In representative embodiments, the other network 1112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g. directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g. all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g. 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g. every STA), including the AP, may sense the primary channel. If the primary channel is sensed/detected and/or determined to be busy by a particular STA, the particular STA may back off. One STA (e.g. only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g. only support for) certain and/or limited bandwidths. The MTC devices may include a battery with a battery life above a threshold (e.g. to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g. MTC type devices) that support (e.g. only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 11D:
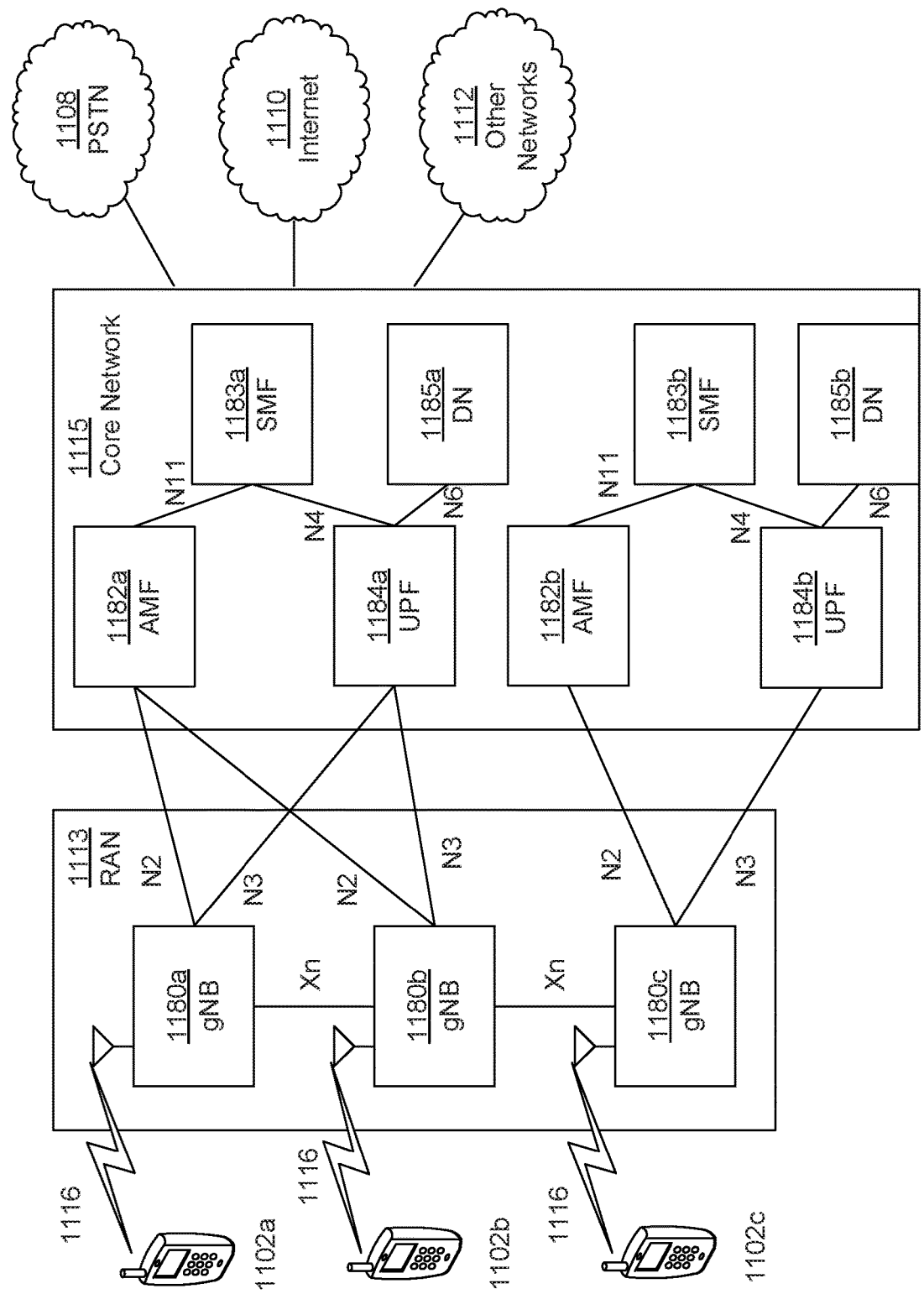
FIG. 11D is a system diagram of further example RAN and a further example CN that may be used within the communications system illustrated in FIG. 11A.

FIG. 11D is a system diagram illustrating the RAN 1113 and the CN 1115 according to an embodiment. As noted above, the RAN 1113 may employ an NR radio technology to communicate with the WTRUs 1102a, 1102b, 1102c over the air interface 1116. The RAN 1113 may also be in communication with the CN 1115.

The RAN 1113 may include gNBs 1180a, 1180b, 1180c, though it will be appreciated that the RAN 1113 may include any number of gNBs while remaining consistent with an embodiment. The gNBs 1180a, 1180b, 1180c may each include one or more transceivers for communicating with the WTRUs 1102a, 1102b, 1102c over the air interface 1116. In one embodiment, the gNBs 1180a, 1180b, 1180c may implement MIMO technology. For example, gNBs 1180a, 1180b may utilize beamforming to transmit signals to and/or receive signals from the gNBs 1180a, 1180b, 1180c. Thus, the gNB 180a, for example, may use multiple antennas to transmit wireless signals to, and/or receive wireless signals from, the WTRU 1102a. In an embodiment, the gNBs 1180a, 1180b, 1180c may implement carrier aggregation technology. For example, the gNB 1180a may transmit multiple component carriers to the WTRU 1102a (not shown). A subset of these component carriers may be on unlicensed spectrum while the remaining component carriers may be on licensed spectrum. In an embodiment, the gNBs 1180a, 1180b, 1180c may implement Coordinated Multi-Point (CoMP) technology. For example, WTRU 1102a may receive coordinated transmissions from gNB 1180a and gNB 1180b (and/or gNB 180c).

The WTRUs 1102a, 1102b, 1102c may communicate with gNBs 1180a, 1180b, 1180c using transmissions associated with a scalable numerology. For example, the OFDM symbol spacing and/or OFDM subcarrier spacing may vary for different transmissions, different cells, and/or different portions of the wireless transmission spectrum. The WTRUs 1102a, 1102b, 1102c may communicate with gNBs 1180a, 1180b, 1180c using subframe or transmission time intervals (TTIs) of various or scalable lengths (e.g. containing varying number of OFDM symbols and/or lasting varying lengths of absolute time).

The gNBs 1180a, 1180b, 1180c may be configured to communicate with the WTRUs 1102a, 1102b, 1102c in a standalone configuration and/or a non-standalone configuration. In the standalone configuration, WTRUs 1102a, 1102b, 1102c may communicate with gNBs 1180a, 1180b, 1180c without also accessing other RANs (e.g. such as eNode-Bs 1160a, 1160b, 1160c). In the standalone configuration, WTRUs 1102a, 1102b, 1102c may utilize one or more of gNBs 1180a, 1180b, 1180c as a mobility anchor point. In the standalone configuration, WTRUs 1102a, 1102b, 1102c may communicate with gNBs 1180a, 1180b, 1180c using signals in an unlicensed band. In a non-standalone configuration WTRUs 1102a, 1102b, 1102c may communicate with/connect to gNBs 1180a, 1180b, 1180c while also communicating with/connecting to another RAN such as eNode-Bs 1160a, 1160b, 1160c. For example, WTRUs 1102a, 1102b, 1102c may implement DC principles to communicate with one or more gNBs 1180a, 1180b, 1180c and one or more eNode-Bs 1160a, 1160b, 1160c substantially simultaneously. In the non-standalone configuration, eNode-Bs 1160a, 1160b, 1160c may serve as a mobility anchor for WTRUs 1102a, 1102b, 1102c and gNBs 1180a, 1180b, 1180c may provide additional coverage and/or throughput for servicing WTRUs 1102a, 1102b, 1102c.

Each of the gNBs 1180a, 1180b, 1180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 1184a, 1184b, routing of control plane information towards Access and Mobility Management Function (AMF) 1182a, 1182b and the like. As shown in FIG. 11D, the gNBs 1180a, 1180b, 1180c may communicate with one another over an Xn interface.

The CN 1115 shown in FIG. 11D may include at least one AMF 1182a, 1182b, at least one UPF 1184a, 1184b, at least one Session Management Function (SMF) 1183a, 1183b, and possibly a Data Network (DN) 1185a, 1185b. While each of the foregoing elements are depicted as part of the CN 1115, it will be appreciated that any of these elements may be owned and/or operated by an entity other than the CN operator.

The AMF 1182a, 1182b may be connected to one or more of the gNBs 1180a, 1180b, 1180c in the RAN 1113 via an N2 interface and may serve as a control node. For example, the AMF 1182a, 1182b may be responsible for authenticating users of the WTRUs 1102a, 1102b, 1102c, support for network slicing (e.g. handling of different PDU sessions with different requirements), selecting a particular SMF 1183a, 1183b, management of the registration area, termination of NAS signaling, mobility management, and the like. Network slicing may be used by the AMF 1182a, 1182b in order to customize CN support for WTRUs 1102a, 1102b, 1102c based on the types of services being utilized WTRUs 1102a, 1102b, 1102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 1162 may provide a control plane function for switching between the RAN 1113 and other RANs (not shown) that employ other radio technologies, such as LTE, LTE-A, LTE-A Pro, and/or non-3GPP access technologies such as WiFi.

The SMF 1183a, 1183b may be connected to an AMF 1182a, 1182b in the CN 1115 via an N11 interface. The SMF 1183a, 1183b may also be connected to a UPF 1184a, 1184b in the CN 1115 via an N4 interface. The SMF 1183a, 1183b may select and control the UPF 1184a, 1184b and configure the routing of traffic through the UPF 1184a, 1184b. The SMF 1183a, 1183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 1184a, 1184b may be connected to one or more of the gNBs 1180a, 1180b, 1180c in the RAN 1113 via an N3 interface, which may provide the WTRUs 1102a, 1102b, 1102c with access to packet-switched networks, such as the Internet 1110, to facilitate communications between the WTRUs 1102a, 1102b, 1102c and IP-enabled devices. The UPF 1184, 1184b may perform other functions, such as routing and forwarding packets, enforcing user plane policies, supporting multi-homed PDU sessions, handling user plane QoS, buffering downlink packets, providing mobility anchoring, and the like.

The CN 1115 may facilitate communications with other networks. For example, the CN 1115 may include, or may communicate with, an IP gateway (e.g. an IP multimedia subsystem (IMS) server) that serves as an interface between the CN 1115 and the PSTN 1108. In addition, the CN 1115 may provide the WTRUs 1102a, 1102b, 1102c with access to the other networks 1112, which may include other wired and/or wireless networks that are owned and/or operated by other service providers. In one embodiment, the WTRUs 1102a, 1102b, 1102c may be connected to a local Data Network (DN) 1185a, 1185b through the UPF 1184a, 1184b via the N3 interface to the UPF 1184a, 1184b and an N6 interface between the UPF 1184a, 1184b and the DN 1185a, 1185b.

In view of FIGS. 11A-11D, and the corresponding description of FIGS. 11A-11D, one or more, or all, of the functions described herein with regard to one or more of: WTRU 1102a-d, Base Station 1114a-b, eNode-B 1160a-c, MME 1162, SGW 1164, PGW 1166, gNB 1180a-c, AMF 1182a-b, UPF 1184a-b, SMF 1183a-b, DN 1185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g. testing) wired and/or wireless communication network in order to implement testing of one or more components. The one or more emulation devices may be test equipment. Direct RF coupling and/or wireless communications via RF circuitry (e.g. which may include one or more antennas) may be used by the emulation devices to transmit and/or receive data.

The processes and techniques described herein may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A device for rendering a 360-degree media content, the device comprising:
   a receiver, configured to receive the 360-degree media content and metadata associated with the 360-degree content, wherein the metadata include a classification of a first spatial region from the 360-degree content;
   a memory, configured to store a user preference;
   a sensor, configured to detect a user movement indicative of a user viewing direction;
   and
   a processor, configured to:
      determine that the user movement is associated with a rendering of the first spatial region,
      determine whether the classification associated with the first spatial region complies with the user preference, and
      alter the rendering of the first spatial region based on a determination that the classification associated with the first spatial region violates the user preference, wherein the rendering of the first spatial region is altered by
         zooming out of the first spatial region so that content that violates the user preference is de-emphasized, or
         zooming in on the first spatial region so that content that violates the user preference is excluded from the rendering.

2. The device of claim 1, wherein the processor is configured to alter the rendering of the first spatial region by changing to a two-dimensional projection format or a rectilinear projection format.

3. The device of claim 1, wherein the processor is configured to alter the rendering of the first spatial region by changing an aspect of the first spatial region.

4. The device of claim 1, wherein the first spatial region comprises a viewport.

5. The device of claim 1, wherein the classification includes a content rating of the first spatial region.

6. The device of claim 1, wherein the metadata is received as part of a media presentation description (MPD), a file encapsulator, a timed metadata track, or a lookup table.

7. A method for rendering a 360-degree media content, the method comprising:
receiving the 360-degree media content and metadata associated with the 360-degree media content, wherein the metadata include a classification of a first spatial region from the 360-degree content;
storing a user preference;
detecting a user movement indicative of a user viewing direction;
determining that the user movement is associated with a rendering of the first spatial region;
determining whether the classification associated with the first spatial region complies with the user preference; and
altering the rendering of the first spatial region based on a determination that the classification associated with the first spatial region violates the user preference, wherein the rendering of the first spatial region is altered by
zooming out of the first spatial region so that content that violates the user preference is de-emphasized, or
zooming in on the first spatial region so that content that violates the user preference is excluded from the rendering.

8. The method of claim 7, wherein altering the rendering of the first spatial region includes changing to a two-dimensional projection format or a rectilinear projection format.

9. The method of claim 7, wherein altering the rendering of the first spatial region includes changing an aspect of the first spatial region.

10. The method of claim 7, wherein the first spatial region comprises a viewport.

11. The method of claim 7, wherein the classification includes a content rating of the first spatial region.

* * * * *